US011810399B2

(12) United States Patent
Jung

(10) Patent No.: US 11,810,399 B2
(45) Date of Patent: Nov. 7, 2023

(54) INFORMATION PROCESSING DEVICE, INFORMATION PROCESSING METHOD, AND PROGRAM

(71) Applicant: SONY CORPORATION, Tokyo (JP)

(72) Inventor: Myungjin Jung, Kanagawa (JP)

(73) Assignee: SONY CORPORATION, Tokyo (JP)

(*) Notice: Subject to any disclaimer, the term of this patent is extended or adjusted under 35 U.S.C. 154(b) by 549 days.

(21) Appl. No.: 16/094,887

(22) PCT Filed: Apr. 12, 2017

(86) PCT No.: PCT/JP2017/015038
§ 371 (c)(1),
(2) Date: Oct. 19, 2018

(87) PCT Pub. No.: WO2017/183543
PCT Pub. Date: Oct. 26, 2017

(65) Prior Publication Data
US 2019/0130179 A1    May 2, 2019

(30) Foreign Application Priority Data
Apr. 21, 2016    (JP) ................................. 2016-084969

(51) Int. Cl.
*G06V 40/18*    (2022.01)
*G06T 7/00*    (2017.01)
(Continued)

(52) U.S. Cl.
CPC .............. *G06V 40/197* (2022.01); *G06T 7/00* (2013.01); *G06T 7/0016* (2013.01); *G06T 7/11* (2017.01);
(Continued)

(58) Field of Classification Search
CPC ........ G06V 40/197; G06V 20/80; G06T 7/11; G06T 7/00; G06T 7/0016
See application file for complete search history.

(56) References Cited

U.S. PATENT DOCUMENTS 9,009,486 B2 * 4/2015 Yokoi .................. H04L 9/0866
                                                      713/186
10,452,910 B2 * 10/2019 Raducan ............ G06K 9/00617
(Continued)

FOREIGN PATENT DOCUMENTS

CN    101178772 A    9/2014
CN    104021350 A    9/2014
(Continued)

OTHER PUBLICATIONS

Zuo, Jinyu, Natalia A. Schmid, and Xiaohan Chen. "On generation and analysis of synthetic iris images." IEEE Transactions on Information Forensics and Security 2.1 (2007): 77-90. (Year: 2007).*
(Continued)

*Primary Examiner* — David Perlman
(74) *Attorney, Agent, or Firm* — XSENSUS LLP

(57) ABSTRACT

[Object] To provide an information processing device, an information processing method, and a program.
[Solution] The information processing device including: a region specification unit configured to specify a biological region for biometric authentication from image data; and an image processing unit configured to perform image processing on a processing region corresponding to the biological region such that biological information acquirable from the biological region is changed.

18 Claims, 19 Drawing Sheets

(51) Int. Cl.
*G06T 11/60* (2006.01)
*G06V 20/80* (2022.01)
*G06T 7/11* (2017.01)
*G06V 20/00* (2022.01)

(52) U.S. Cl.
CPC ............. *G06T 11/60* (2013.01); *G06V 20/80* (2022.01); *G06T 2207/20192* (2013.01); *G06T 2207/20201* (2013.01); *G06T 2207/30041* (2013.01); *G06T 2207/30101* (2013.01); *G06T 2207/30201* (2013.01); *G06V 20/95* (2022.01)

(56) References Cited

U.S. PATENT DOCUMENTS

| | | |
|---|---|---|
| 2005/0226470 A1 | 10/2005 | Kondo et al. |
| 2008/0112645 A1 | 5/2008 | Asano |
| 2009/0046904 A1* | 2/2009 | Moon .................... G06K 9/001 382/124 |
| 2010/0014718 A1* | 1/2010 | Savvides .................. G06T 7/11 382/117 |
| 2010/0046805 A1* | 2/2010 | Connell ............. G06K 9/00597 382/115 |
| 2010/0046808 A1* | 2/2010 | Connell .................. G06F 21/32 382/117 |
| 2012/0269441 A1* | 10/2012 | Marchesotti ......... G06V 10/806 382/195 |
| 2013/0162799 A1* | 6/2013 | Hanna .................... G06V 40/19 348/78 |
| 2013/0259322 A1* | 10/2013 | Lin ...................... G06K 9/0061 382/117 |
| 2013/0336545 A1* | 12/2013 | Pritikin .................. G06V 40/67 382/116 |

FOREIGN PATENT DOCUMENTS

| | | | |
|---|---|---|---|
| CN | 104778417 A | 7/2015 | |
| CN | 104809744 A | 7/2015 | |
| EP | 1586925 A1 | 10/2005 | |
| EP | 2 911 088 A2 | 8/2015 | |
| EP | 3065024 A1 * | 9/2016 | ......... G06K 9/00228 |
| JP | S58-31478 A | 2/1983 | |
| JP | 2007-34876 A | 2/2007 | |
| JP | 2008-46677 A | 2/2008 | |
| JP | 2010020670 A | 1/2010 | |
| JP | 2010287023 A | 12/2010 | |
| WO | WO-2004090814 A1 | 10/2004 | |
| WO | 2007/060980 A1 | 5/2007 | |
| WO | 2010/058514 A1 | 4/2012 | |

OTHER PUBLICATIONS

Rathgeb, C., & Uhl, A. (Jun. 2012). Iris-biometric fuzzy commitment schemes under signal degradation. In International Conference on Image and Signal Processing (pp. 217-225). Springer, Berlin, Heidelberg. (Year: 2012).*

Zuo, J., Ratha, N. K., & Connell, J. H. (2008, December). Cancelable iris biometric. In 2008 19th International conference on pattern recognition (pp. 1-4). IEEE. (Year: 2008).*

English-language translation of International Search Report and Written Opinion for International Application No. PCT/JP2017/015038 dated Jul. 4, 2017.

Extended European Search Report dated Jan. 4, 2019, issued in European Patent Application No. 17785882.6.

Korshunov Pavel et al: "Using warping for privacy protection in video surveillance", 2013 18th International Conference on Digital Signal Processing (DSP), IEEE, Jul. 1, 2013 (Jul. 1, 2013), pp. 1-6, XP032498538, ISSN: 1546-1874, DOI: 10.1109/ICDSP.2013.6622791 [retrieved on Oct. 6, 2013].

* cited by examiner

FIG. 11
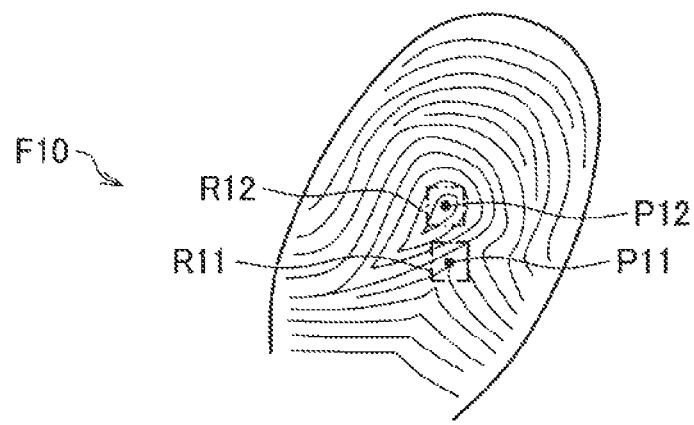
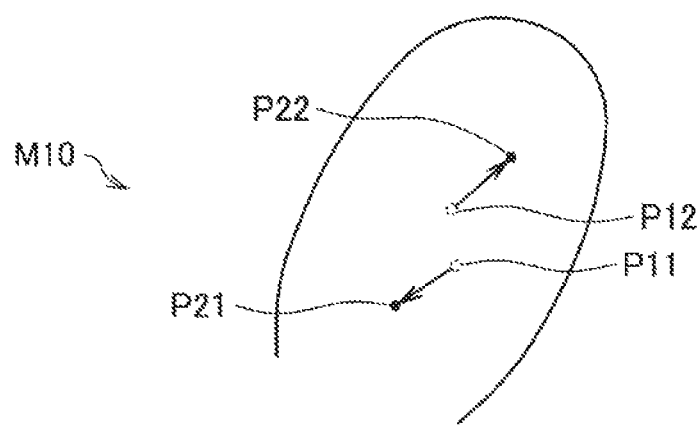
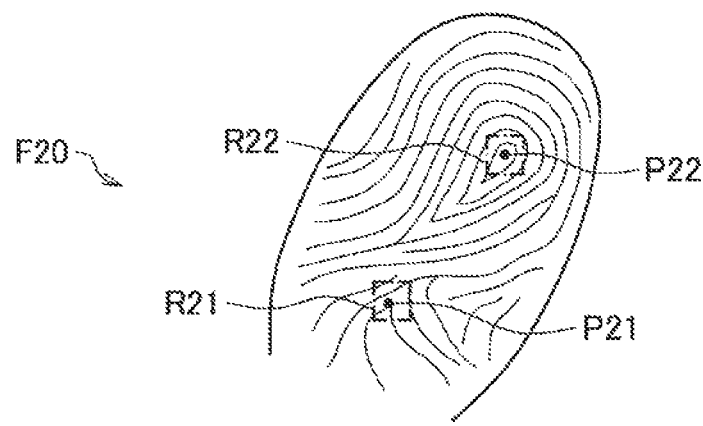

FIG. 12
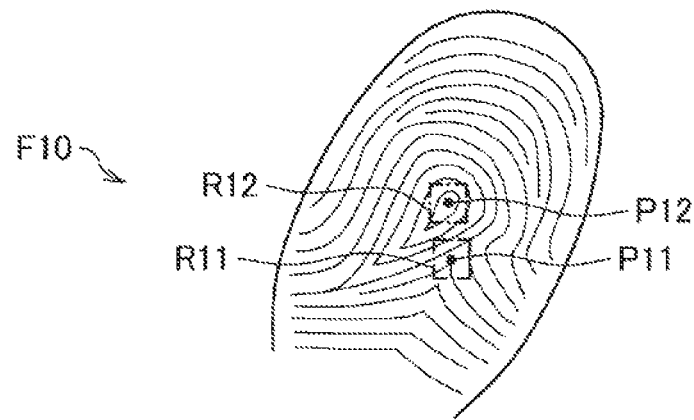
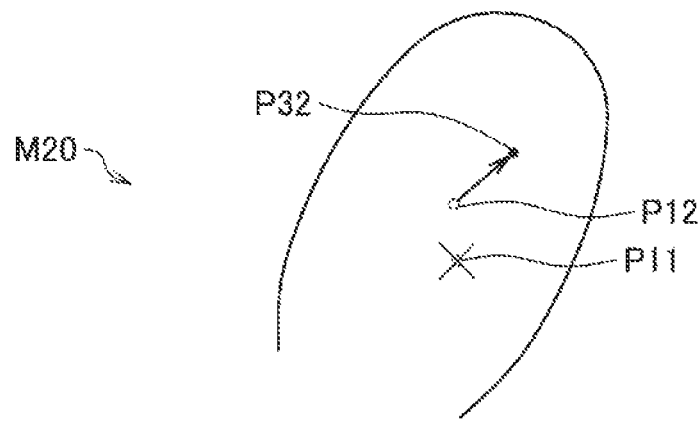
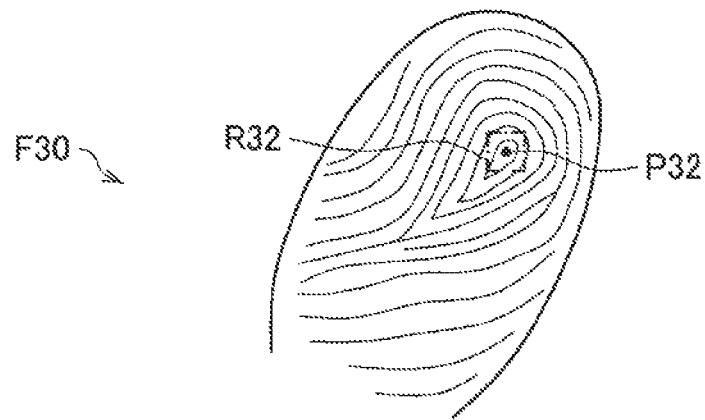

FIG. 15
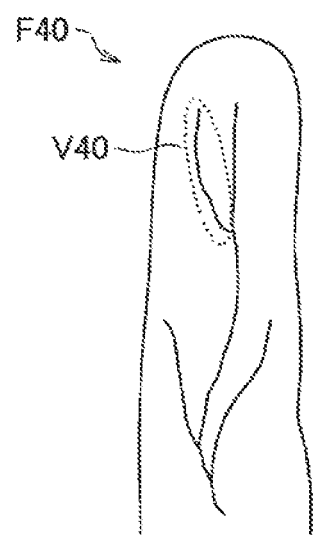
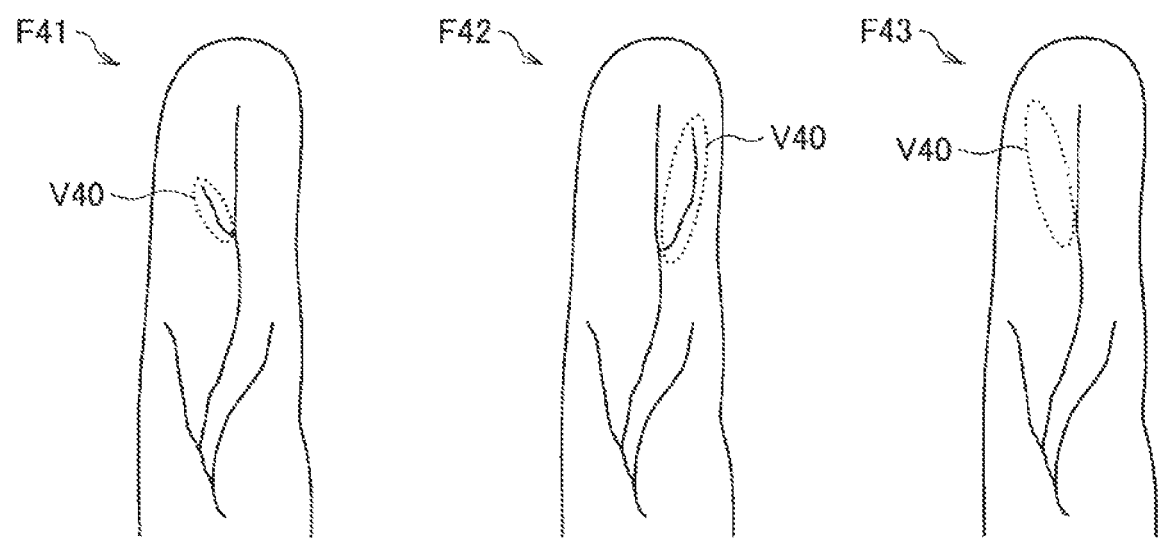

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

Among authentication technologies for verifying identity, there is iris authentication as one type of biometric authentication. Iris authentication is a technology for verifying identity using iris information acquired from the circular iris around the pupil in the eye as disclosed in, for example, Patent Literature 1. Iris authentication has also been used recently in authentication for using a mobile terminal such as a smartphone in addition to, for example, authentication for entry, logging in to a computer, and the like.

Meanwhile, as mobile terminals having a communication function and an imaging function such as smartphones have become widespread, and the like, a large number of captured images are being published on networks. In addition, the quality of the images published on the networks has improved in accordance with the development of camera technologies.

CITATION LIST

Patent Literature

Patent Literature 1: JP 2007-34876A

DISCLOSURE OF INVENTION

Technical Problem

However, in a case in which an iris is included in an image published to a third party, there is concern of the third party acquiring iris information from the image and committing false authentication through iris authentication.

Therefore, the present disclosure proposes an information processing device, an information processing method, and a program which can prevent false authentication committed by using iris information acquired from an image.

Solution to Problem

According to the present disclosure, there is provided an information processing device including: a region specification unit configured to specify a biological region for biometric authentication from image data; and an image processing unit configured to perform image processing on a processing region corresponding to the biological region such that biological information acquirable from the biological region is changed.

In addition, according to the present disclosure, there is provided an information processing method including: specifying a biological region for biometric authentication from image data; and performing image processing on a processing region corresponding to the biological region such that biological information acquirable from the biological region is changed.

In addition, according to the present disclosure, there is provided a program for causing a computer to achieve: a function of specifying a biological region for biometric authentication from image data; and a function of performing image processing on a processing region corresponding to the biological region such that biological information acquirable from the biological region is changed.

Advantageous Effects of Invention

According to the present disclosure described above, it is possible to prevent false authentication committed by using iris information acquired from an image.

Note that the effects described above are not necessarily limitative. With or in the place of the above effects, there may be achieved any one of the effects described in this specification or other effects that may be gasped from this specification.

BRIEF DESCRIPTION OF DRAWINGS

FIG. 11 is an explanatory diagram illustrating an example of a feature point deformation process.

FIG. 12 is an explanatory diagram illustrating an example of the feature point deformation process.

FIG. 15 is an explanatory diagram illustrating an example of a vein deformation process.

MODE(S) FOR CARRYING OUT THE INVENTION

Figure 1:
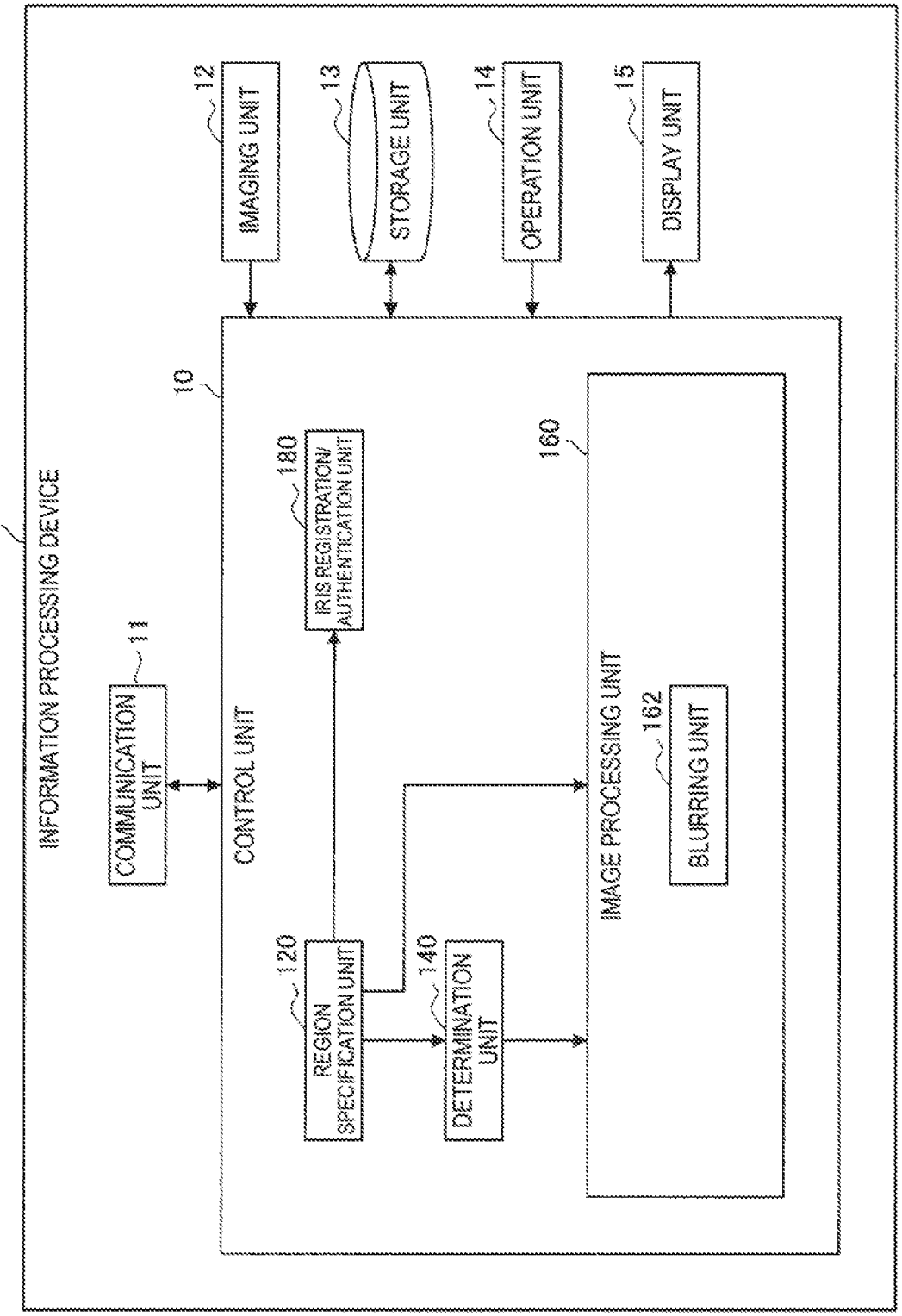
FIG. 1 is an explanatory diagram illustrating a configuration example of an information processing device 1 according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

<<1. FIRST EMBODIMENT>>
<1-1. Overview>
<1-2. Configuration Example>
<1-3. Operation Example>
<1-4. Effect>
<1-5. Supplement>
<<2. SECOND EMBODIMENT>>
<2-1. Configuration Example>
<2-2. Operation Example>
<2-3. Effect>
<<3. THIRD EMBODIMENT>>
<3-1. Configuration Example>
<3-2. Operation Example>
<3-3. Effect>
<3-4. Supplement>
<<4. MODIFIED EXAMPLES>>
<4-1. Modified Example 1>
<4-2. Modified Example 2>
<4-3. Modified Example 3>
<<5. HARDWARE CONFIGURATION EXAMPLE>>
<<6. CONCLUSION>>

1. FIRST EMBODIMENT

1-1. Background

The background to creation of an information processing device of a first embodiment of the present disclosure will be first described before the information processing device according to the present embodiment is described.

In recent years, iris authentication has been used as an authentication technique for verifying identity. Iris authentication is a technique of verifying identity using iris information (an example of biological information) acquired from the circular iris around the pupil in the eye. In accordance with the recent development of camera technologies, it is possible to capture images with quality in which iris information for iris authentication can be acquired not only by using devices dedicated to iris authentication but also by using cameras of mobile terminals such as smartphones.

In addition, as mobile terminals with cameras such as smartphones have become widespread, a large number of captured images are being published on networks. Among images published on networks, there are many so-called self-photographed images (selfies), and most self-photographed images include face regions of users in large sizes. In addition, in accordance with the recent development of camera technologies, the quality of published images has improved.

In a case in which an image including a face region of a user is published to be viewed even by a third party, there is concern of the third party acquiring iris information for iris authentication and committing false authentication in iris authentication.

Therefore, the present embodiment has been created focusing on the above-described situation. According, to the present embodiment, it is possible to prevent false authentication committed by using, iris information acquired from an image. A configuration example for realizing this effect will be described below in the first embodiment of the present disclosure.

1-2. Configuration Example

FIG. 1 is an explanatory diagram illustrating a configuration example of an information processing device 1 according to the first embodiment of the present disclosure. As illustrated in FIG. 1, the information processing device 1 according to the present embodiment has a control unit 10, a communication unit 11, an imaging unit 12, a storage unit 13, an operation unit 14, and a display unit 15.

The control unit 10 controls each configuration of the information processing device 1. For example, the control unit 10 has a communication control function of controlling communication by the communication unit 11, which will be described below, and a display control function of controlling display by the display unit 15. In addition, the control unit 10 of the present embodiment also functions as a region specification unit 120, a determination unit 140, an image processing unit 160, and an iris registration/authentication unit 180 as illustrated in FIG. 1.

The region specification unit 120 specifies an iris region (an example of a biological region) from an input image (image data) acquired by the imaging unit 12. For example, the region specification unit 120 may specify a black eye part (pupil) and a white eye part in an eye region detected using a face recognition technology or the like, and specify a region specified at the boundary of the pupil and the boundary of the white as an iris region.

Information of the iris region specified by the region specification unit 120 is provided to the determination unit 140, the image processing unit 160, and the iris registration/authentication unit 180.

Note that image data that is subject to specification of an iris region by the region specification unit 120 is not limited to images acquired by the imaging unit 12, and for example, images acquired from an external device via the communication unit 11 are possible and images stored in advance in the storage unit 13 are possible.

The determination unit 140 determines whether iris information to be used in iris authentication can be acquired from the iris region specified by the region specification unit 120. For example, the determination unit 140 may determine whether iris information can be acquired from the iris region on the basis of a size of the iris region or color included in the iris region.

For example, the size of the iris region to be used in determination of the determination unit 140 may be a horizontal distance between the left end and the right end of the iris region, may be the outer diameter of a circle that is obtained by approximating the iris region to a circle, or may be the area of the iris region. In addition, the determination unit 140 may determine that iris information can be acquired from the iris region, for example, in a case in which the size of the iris region is greater than or equal to a predetermined value.

In addition, the determination unit 140 may determine that iris information can be acquired from the iris region in a case in which an average value of color included in the iris region comes within a predetermined color range. The predetermined color range may be, for example, a range representing blue or green.

The determination unit 140 may determine that iris information can be acquired from the iris region in a case in which, for example, the horizontal distance from the left end to the right end of the iris region is greater than or equal to a predetermined value (e.g., 150 pixels) and an average value of color included in the iris region comes within the predetermined color range.

Note that, in a case in which the determination unit 140 determines that iris information can be acquired from the iris region, the control unit 10 may perform control such that the display unit 15 makes a warning display. According to this configuration, a user ascertains that iris information can be acquired from the image (image data) and thus can set, for example, the image not to be transmitted to the outside or set image processing by the image processing unit 160, which will be described below, to be performed.

In addition, the determination unit 140 may determine whether iris information can be acquired from the iris region specified from the image data by the region specification unit 120 in a case in which an operation input for transmitting the image data to the outside is performed via the operation unit 14, which will be described below. According to this configuration, since it is determined whether iris information can be acquired from the image data before the image data is transmitted to the outside, false authentication can be prevented more reliably.

The image processing unit 160 performs image processing on a processing region corresponding to the iris region so that iris information that can be acquired from the iris region specified by the region specification unit 120 is changed and thereby generates an output image. The processing region may be, for example, the iris region itself, a rectangular region circumscribing the iris region, or a region including the iris region and a pupil region.

For example, the image processing unit 160 may generate an output image by extracting the iris region specified by the region specification unit 120 from the input image as a processing region and performing image processing thereon, and then combining the image processing result with the input image.

According to this configuration, iris information that can be acquired from the output image is different from the iris information that can be acquired from the input image, and therefore, even in a case in which the output image is provided to a third party, for example, false authentication committed by the third party can be prevented.

In addition, the image processing unit 160 may perform image processing on the processing region in the case in which the determination unit 140 determines that iris information can be acquired from the iris region. According to this configuration, the image processing, which will be described below, may be performed in the case in which iris information can be acquired from the iris region, and thus a processing amount in a case in which it is not possible to acquire iris information can be reduced. In addition, since image processing by the image processing unit 160 is not performed in the case in which it is not possible to acquire iris information, no influence is caused by the image processing (e.g., image deterioration, etc.).

The image processing unit 160 according to the present embodiment has the function of a blurring unit 162 as illustrated in FIG. 1, and image processing performed by the image processing unit 160 includes a blurring process performed by the blurring unit 162. The processing performed by the blurring unit 162 may be, for example, normalized blur (Box blur) processing in which a 3×3 filter as shown in the following formula is applied to the range of 3×3 pixels around each pixel.

[Math. 1]
$$\frac{1}{9}\begin{bmatrix} 1 & 1 & 1 \\ 1 & 1 & 1 \\ 1 & 1 & 1 \end{bmatrix} \tag{1}$$

In addition, the blurring process performed by the blurring unit 162 may for example, Gaussian blur (Gaussian blur) processing in which 3×3 filter as shown in the following formula is applied to the range of 3×3 pixels around each pixel.

[Math. 2]
$$\frac{1}{16}\begin{bmatrix} 1 & 2 & 1 \\ 2 & 4 & 2 \\ 1 & 2 & 1 \end{bmatrix} \tag{2}$$

Note that, although the examples in which a 3×3 filter is used in the blurring process by the blurring unit 162 have been introduced, the present technology is not limited thereto, and the blurring process may be performed using a filter of another size.

Figure 2:
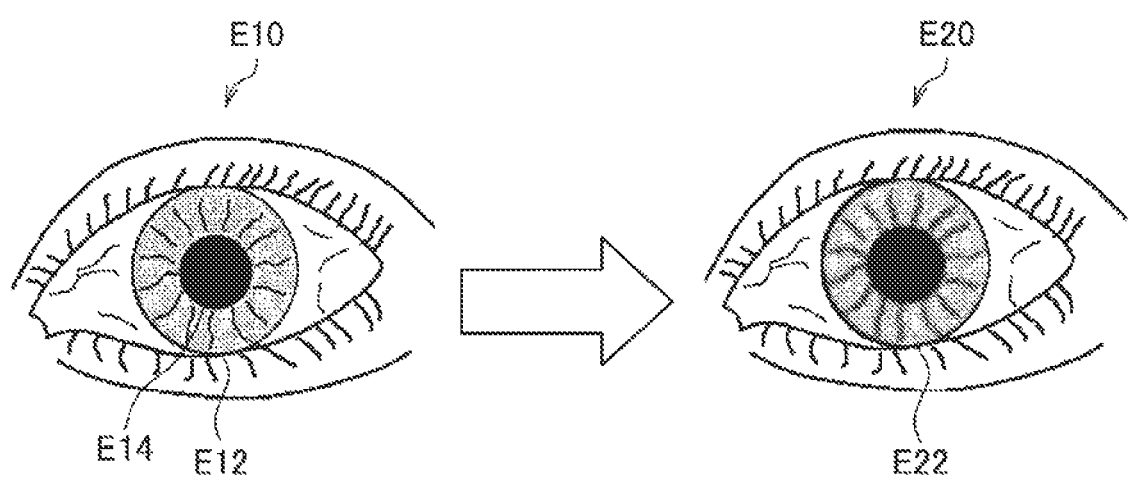
FIG. 2 is an explanatory diagram schematically illustrating image processing by an image processing unit 160 according to the embodiment.

FIG. 2 is an explanatory diagram schematically illustrating image processing by the image processing unit 160 according to the present embodiment. In an input image E10 illustrated in FIG. 2, an iris region E12 is specified by the region specification unit 120. Note that the iris region E12 is specified as, for example, a peripheral region of a pupil region E14 as illustrated in FIG. 2.

The image processing unit 160 performs a blurring process (an example of image processing) by extracting the iris region E12 from the input image E10 illustrated in FIG. 2, combines the result of the blurring process with the input image E10, and thereby generates an output image E20. As illustrated in FIG. 2, in an iris region E22 of an output image E20, a blur (blur) effect has occurred, and patterns have been lost or become unclear in comparison to the iris region E12 in the input image E10.

Iris information acquired from the iris region E22 illustrated in FIG. 2 is different from original iris information (to be used in iris authentication) acquired from the iris region E12, and thus even in a case in which the output image E20 is provided to a third party false authentication by the third party can be prevented.

In addition, since the blurring process is performed on a processing region (the iris region E12) in the example of FIG. 2 as described above, no influence from the blurring process is given to regions other than the iris region E22 as in the output image E20 of FIG. 2, and thus influence or a sense of incongruity is smaller in comparison to the processing performed on the entire image.

Note that, although the example in which an input image is an eye image has been introduced in FIG. 2, an input image is not limited to an eye image. In addition, an output image generated by the image processing unit 160 may be stored in, for example, the storage unit 13, or may be transmitted to an external device via the communication unit 11.

The iris registration/authentication unit 180 illustrated in FIG. 1 performs a registration process of iris information related to iris authentication and an authentication process of collating registered iris information with iris information for authentication. The iris registration authentication unit 180 may perform the registration process or the authentication process in accordance with, for example, an input of a user via the operation unit 14, which will be described below.

The iris registration/authentication unit 180 performs the registration process by for example, acquiring iris information from the iris region specified by the region specification unit 120 and causing the iris information to be stored in the storage unit 13. In addition, the iris registration/authentication unit 180 performs the authentication process by acquiring iris information from the iris region specified by the region specification unit 120 and collating the iris information with iris information stored in the storage unit 13.

The communication unit 11 performs transmission and reception (communication) of data with an external device. For example, the communication unit 11 may transmit an output image generated by the image processing unit 160 to an external device.

The imaging unit 12 is a camera module that acquires images. The imaging unit 12 acquires an image by imaging a real space using an image sensor such as a charge coupled device (CCD) or a complementary metal oxide semiconductor (CMOS). The image acquired by the imaging unit 12 is provided to, for example, the region specification unit 120 as an input image.

The storage unit 13 stores programs and parameters for helping each configuration of the information processing device 1 to function. For example, the storage unit 13 may store registered iris information. In addition, the storage unit 13 may store an output image generated by the image processing unit 160 performing image processing on the iris region of the input image.

The operation unit 14 receives an input of the user and provides the input to the control unit 10. For example, the user may operate the operation unit 14 to select a mode of the information processing device 1, and for example, may select either a registration/authentication mode for registering iris information or performing iris authentication or an imaging mode for capturing and recording an image. In addition, the user may operate the operation unit 14 to switch the setting of the image processing function with respect to the iris region (which may be referred to as an iris processing setting below) by the image processing unit 160 on or off.

In addition, the user may operate the operation unit 14 to perform an operation input for transmitting image data obtained by the imaging unit 12 or image data stored in the storage unit 13 to the outside.

Note that the operation unit 14 may be realized by, for example, a touch panel, or by a mouse, a keyboard, a button, a switch, a lever, a dial, or the like.

The display unit 15 is a display device, for example, a display or the like, and displays various screens under control of the control unit 10. For example, the display unit 15 may display a mode selection screen for allowing the user to select either the registration/authentication mode or the imaging mode.

In addition, in a case in which the determination unit 140 determines that iris information can be acquired from the iris region of the input image and the iris processing setting is turned off, the display unit 15 may urge the user to turn on the iris processing setting and display a warning screen for switching the iris processing setting. With this configuration, the user can ascertain that the iris information can be acquired from the input image and the iris processing setting can be performed by the user to prevent the iris information from being acquired by a third party.

The configuration example of the information processing device 1 according to the present embodiment has been described above in detail. Note that the configuration of the information processing device 1 illustrated in FIG. 1 is an example, and the present embodiment is not limited thereto. Although the example in which the information processing device 1 has the image processing function and the iris registration/authentication function has been described above, for example, the present technology is not limited thereto, and the image processing function and the iris registration/authentication function may be provided in different devices. In addition, the information processing device 1 may be a mobile terminal carried by a user, for example, a smartphone, a personal digital assistant (PDA), or the like, a personal computer (PC), a digital home appliance, a game machine, or any other type of device. In addition, each function of the control unit 10 according to the present embodiment may be included in another information processing device connected via the communication unit 11.

1-3. Operation Example

Figure 3:
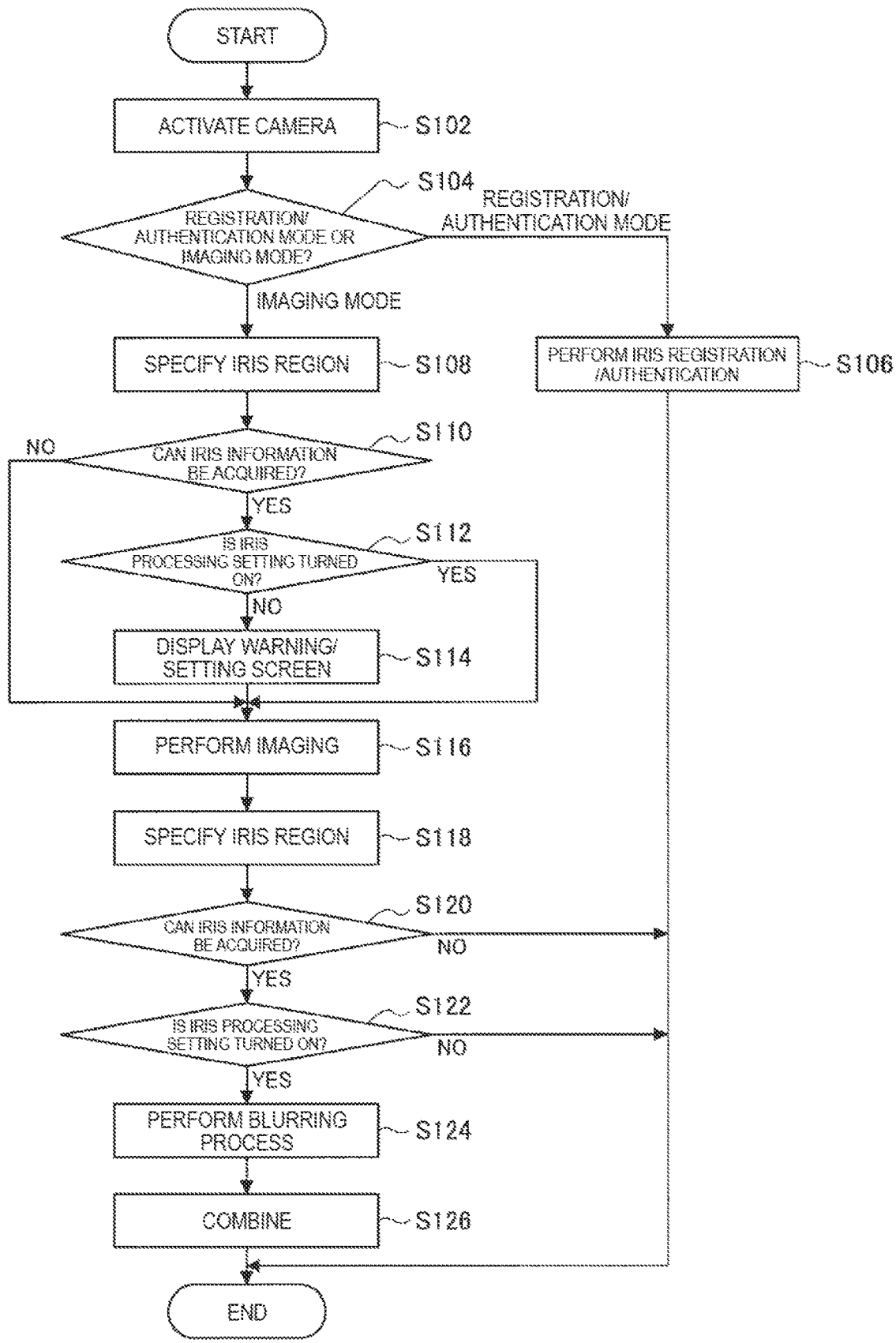
FIG. 3 is a flowchart illustrating an operation example of the information processing device 1 according to the embodiment.

Next, an operation example of the information processing device 1 according to the present embodiment will be described with reference to FIG. 3. FIG. 3 is a flowchart illustrating an operation example of the information processing device 1 according to the present embodiment.

As illustrated in FIG. 3, when a camera (the imaging unit 12) is activated by a user operation (S102), the display unit 15 is controlled by the control unit 10 to display a mode selection screen for allowing the user select either the registration/authentication mode or the imaging mode (S104).

In a case in which the user selects the registration/authentication mode, the process proceeds to Step S106, and the iris registration/authentication unit 180 performs an iris information registration process or an iris authentication process.

On the other hand, in a case in which the user selects the imaging mode, the process proceeds to Step S108, and the region specification unit 120 specifies an iris region from an image acquired by the imaging unit 12. Next, the determination unit 140 determines whether iris information can be acquired from the iris region specified in Step S108 (S110).

In a case in which iris information can be acquired and the iris processing setting is turned off (YES in S110 and NO in S112), the control unit 10 urges the user to turn on the iris processing setting and causes the display unit 15 to display a warning/setting screen for switching the iris processing setting (S114). After a user operation is performed on the warning/setting screen, the process proceeds to Step S116.

On the other hand, in a case in which it is determined that it is not possible to acquire iris information (NO in S110) or in a case in which it is determined that iris information can be acquired and the iris processing setting is turned on (YES in S110 and YES in S112), the process proceeds to Step S116.

When imaging is executed through a user operation in Step S116, for example, an input image is acquired by the imaging unit 12, and the region specification unit 120 specifies an iris region from the acquired input image (S118). Next, the determination unit 140 determines whether iris information can be acquired from the iris region specified in Step S118 (S120). In a case in which it is determined that it is not possible to acquire iris information (NO in S120) or the iris processing setting is turned off although it is determined that iris information can be acquired (YES in S120 and NO in S122), the process ends.

On the other hand, in a case in which it is determined that iris information can be acquired and the iris processing setting is turned on (YES in S120 and YES in S122), the blurring unit 162 of the image processing unit 160 performs a blurring process on the iris region (an example of a processing region) extracted from the input image (S124). Furthermore, the image processing unit 160 combines the result obtained by performing the blurring process on the iris region with the iris region of the input image and thereby generates an output image (S126).

The operation example of the information processing device 1 according to the present embodiment has been described above in detail. Note that the operation of the information processing device 1 illustrated in FIG. 3 is an example, and the present embodiment is not limited thereto. For example, processes similar to Steps S118 to S126 illustrated in FIG. 3 may be performed using an image acquired by the communication unit 11 from an external device as an input image.

1-4. Effect

According to the first embodiment of the present disclosure, false authentication can be prevented by performing image processing of changing iris information that can be acquired as described above.

1-5. Supplement

Note that, although the example in which the image processing unit 160 performs the image processing of changing iris information that can be acquired from the iris region in the case in which the determination unit 140 determines that the iris information can be acquired from the iris region and the iris processing setting is turned on has been described above, the present technology is not limited thereto.

In the case in which the determination unit 140 determines that iris information can be acquired from the iris region, for example, the image processing unit 160 may perform the image processing of changing the iris information that can be acquired from the iris region regardless of a setting made by the user. In addition, the information processing device 1 may not have the determination unit 140, and for example, the image processing unit 160 may perform the image processing on an iris region specified by the region specification unit 120 at all times.

2. SECOND EMBODIMENT

The first embodiment of the present disclosure has been described above. Next, a second embodiment of the present disclosure will be described. Image processing performed in the second embodiment to be described below includes, in addition to the blurring process described in the first embodiment, a process of changing a value of a pixel randomly selected and an edge emphasis process.

2-1. Configuration Example

Figure 4:
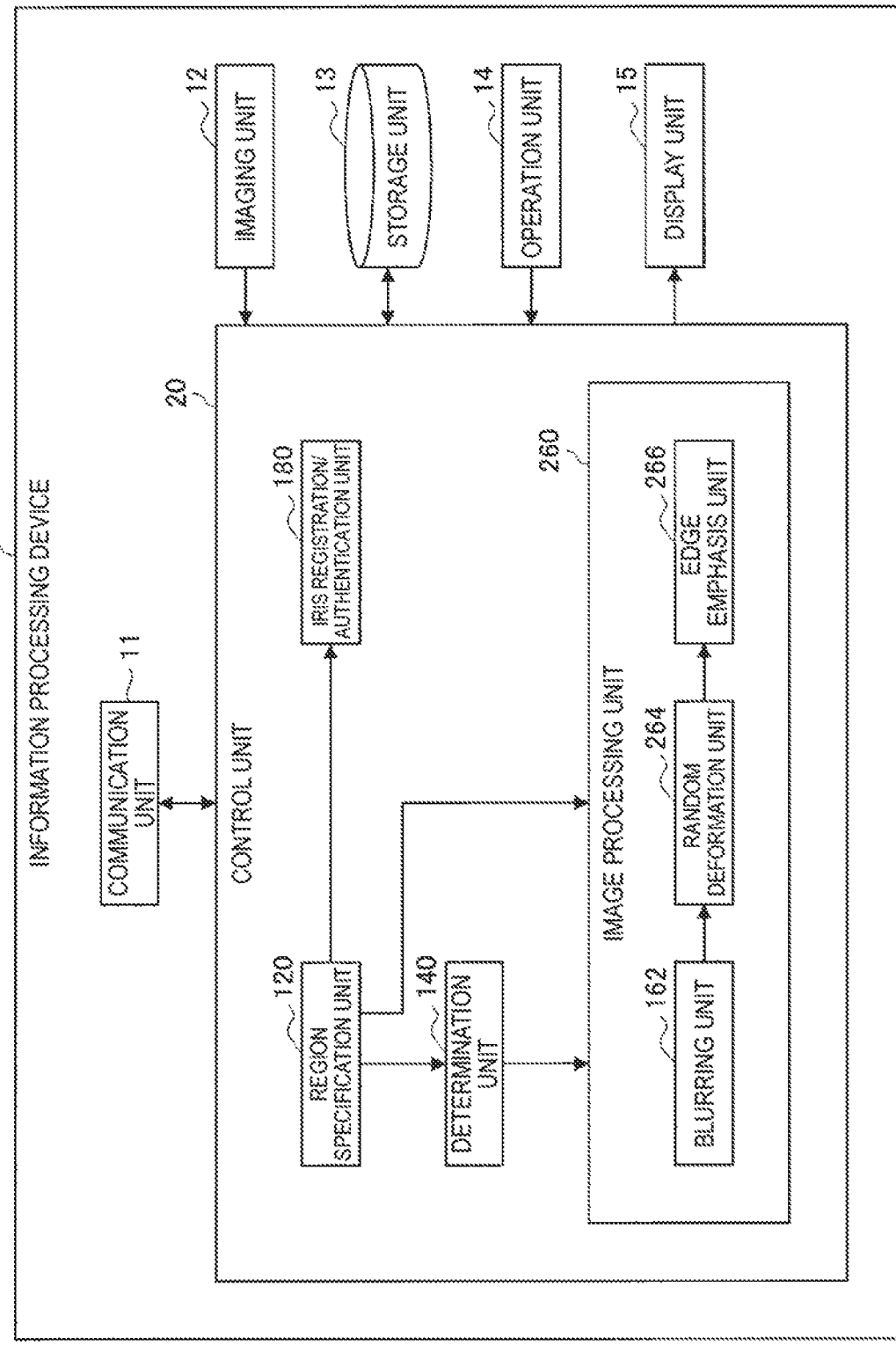
FIG. 4 is a block diagram illustrating a configuration example of an information processing device 2 according to a second embodiment of the present disclosure.

FIG. 4 is a block diagram illustrating, a configuration example of an information processing device 2 according to the second embodiment of the present disclosure. As illustrated in FIG. 4, the information processing device 2 according to the present embodiment is different from the information processing device 1 of FIG. 1 in that some of functional configurations of a control unit 20 are different from the functional configurations of the control unit 10 illustrated in FIG. 1. Note that substantially similar configurations among the respective configurations illustrated in FIG. 4 to those illustrated in FIG. 1 are given the same reference numerals, and thus description thereof will be omitted. Functions as an image processing unit 260 included in the control unit 20 according to the present embodiment will be described below.

The image processing unit 260 performs image processing on a processing region corresponding to an iris region so that iris information that can be acquired from the iris region specified by the region specification unit 120 is changed and thereby generates an output image, similarly to the image processing unit 160 described with reference to FIG. 1. As illustrated in FIG. 4, the image processing unit 260 according to the present embodiment has functions as a random deformation unit 264 and an edge emphasis unit 266 in addition to the function as the blurring unit 162. The functions of the random deformation unit 264 and the edge emphasis unit 266 included in the image processing unit 260 will be described below. Note that image processing performed by the image processing unit 260 according to the present embodiment further includes, in addition to the blurring process by the blurring unit 162 described with reference to FIG. 1, processing by the random deformation unit 264 and processing by the edge emphasis unit 266, which will be described below.

The random deformation unit 264 changes a value of a pixel (e.g., a so-called RGB value) randomly selected among pixels of the processing region (e.g., the iris region). The value of the pixel after the change may be the value obtained by adding a predetermined value to the value of the pixel before the change, or may be a value randomly selected. In addition, the process of changing the value of the pixel by the random deformation unit 264 may be performed, for example, after the blurring process by the blurring unit 162.

In this configuration, it is difficult to acquire iris information before the image processing performed by the image processing unit 260 from the iris region image-processed by the image processing unit 260, and thus false authentication can be prevented more reliably.

The edge emphasis unit 266 performs the edge emphasis process of emphasizing edges (contours) on the processing region. The edge emphasis process by the edge emphasis unit 266 may be, for example, a process to which an edge emphasis filter is applied. In addition, the edge emphasis process by the edge emphasis unit 266 may be performed, for example, after the process of changing the value of the pixel by the random deformation unit 264.

With this configuration, influence of the blurring process by the blurring unit 162 is reduced, a difference in image quality between the processing region and regions other than the processing region can be reduced, and therefore a user viewing the output image is unlikely to feel a sense of incongruity.

2-2. Operation Example

Figure 5:
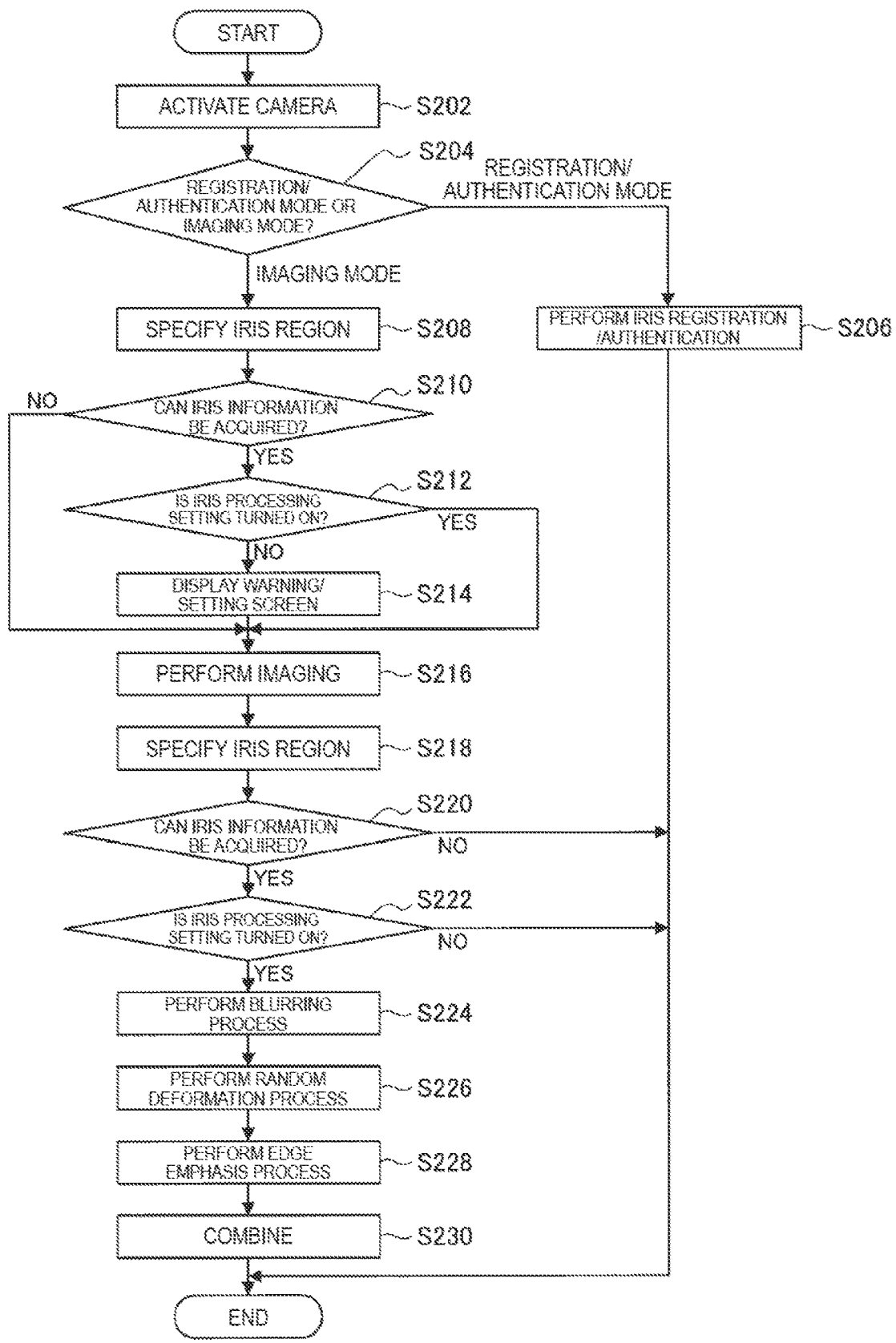
FIG. 5 is a flowchart illustrating an operation example of the information processing device 2 according to the embodiment.

The configuration example of the information processing device 2 according to the second embodiment of the present disclosure has been described above. Next, an operation example of the information processing device 2 according to the present embodiment will be described with reference to FIG. 5. FIG. 5 is a flowchart illustrating the operation example of the information processing device 2 according to the present embodiment.

Processes of Step S202 to S224 illustrated in FIG. 5 have been described with reference to FIG. 3. Since the processes are similar to the processes of Steps S102 to S124, description thereof will be omitted. Next, in Step S226, the random deformation unit 264 of the image processing unit 260 performs a random deformation process of changing the value of a pixel randomly selected among pixels of an iris region (an example of a processing region).

Next, the edge emphasis unit 266 of the image processing unit 260 performs an edge emphasis process of emphasizing an edge (contour) on the iris region (S228). Furthermore, the image processing unit 260 combines the result obtained by performing the processes of Steps S224 to S228 on the iris region with the iris region of the input image and thereby generates an output image (S230).

2-3. Effect

As described above, according to the second embodiment of the present disclosure, false authentication can be prevented by performing the image processing of changing iris information that can be acquired. In addition, by performing the blurring process, the random deformation process, and then the edge emphasis process, a sense of incongruity imparted to a user can be reduced while changing the iris information that can be acquired.

3. THIRD EMBODIMENT

The first and second embodiments of the present disclosure have been described above. Next, as a third embodiment of the present disclosure, an example in which an information processing device further has a restoration unit that restores an input image from an output image obtained by performing image processing on a processing region will be described. Note that, in the present embodiment, the formula of restoring an input image from an output image is not limited to acquiring an image that completely matches an output image, and includes estimating an input image from an output image.

3-1. Configuration Example

Figure 6:
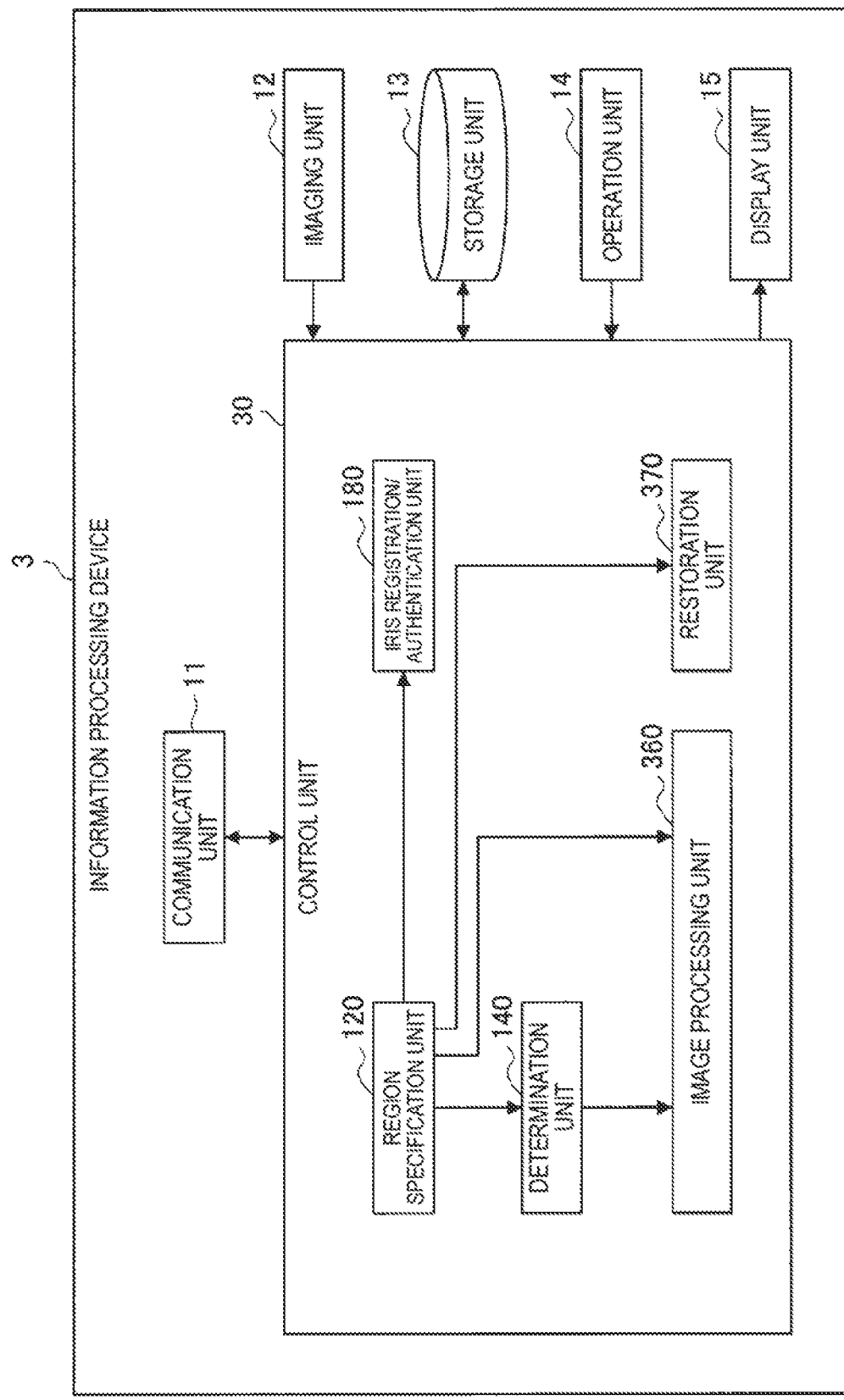
FIG. 6 is a block diagram illustrating a configuration example of an information processing device 3 according to a third embodiment of the present disclosure.

FIG. 6 is a block diagram illustrating a configuration example of an information processing device 3 according to the third embodiment of the present disclosure. As illustrated in FIG. 6, the information processing device 3 according to the present embodiment is different from the information processing device 1 of FIG. 1 in that some of functional configurations of a control unit 30 are different from the functional configurations of the control unit 10 illustrated in FIG. 1. Note that substantially similar configurations among the respective configurations illustrated in FIG. 6 to those illustrated in FIG. 1 are given the same reference numerals, and thus description thereof will be omitted. Functions as an image processing unit 360 and restoration unit 370 included in the control unit 30 according to the present embodiment will be described below.

The image processing unit 360 performs image processing on a processing region corresponding to an iris region so that iris information that can be acquired from the iris region is changed and thereby generates an output image, similarly to the image processing unit 160 described with reference to FIG. 1 and the image processing unit 260 described with reference to FIG. 4. In addition, the image processing unit 360 according to the present embodiment may cause the storage unit 13 to store a parameter of the image processing performed on the processing region. Note that the processing region on which the image processing is performed by the image processing unit 360 according to the present embodiment may be, for example, the iris region itself.

Figure 7:
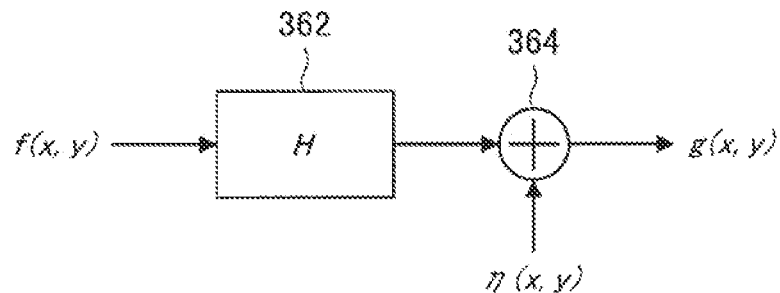
FIG. 7 is an explanatory diagram schematically illustrating an example of an image processing unit 360 according to the embodiment.

FIG. 7 is an explanatory diagram schematically illustrating an example of the image processing unit 360 according to the present embodiment. f(x, y) input to a filter unit 362 illustrated in FIG. 7 represents an iris region (an example of a processing region) of an input image. In addition, a transfer function H(u, v) of the filter unit 362 illustrated in FIG. 7 is a Fourier transform of a function h(x, y) shown below, for example.

[Math. 3]

$$h(x, y) = \frac{1}{2\pi\sigma^2} e^{-r^2/2\sigma^2} \quad (3)$$

Note that, in the above formula (3), r represents a radius (a distance to a filter center) and $\sigma^2$ represents variance.

In addition, an addition unit 364 adds a noise function η(x, y) to the output of the filter unit 362 and then outputs g(x, y). Note that the noise function η(x, y) represents, for example, white Gaussian noise with an average of 0. In addition, the image processing unit 360 combines g(w, y) with the input image and thereby generates an output image.

Note that image processing by the image processing unit 360 according to the present embodiment is not limited to the above example. Image processing by the image processing unit 360 may include the random deformation process and the edge emphasis process, for example, similarly to the image processing unit 260 described with reference to FIG. 4.

The restoration unit 370 restores the input image (image data) from the output image obtained by performing the image processing on the processing region. The restoration process by the restoration unit 370 may be performed using various methods in accordance with the image processing performed by the image processing unit 360. In addition, the restoration unit 370 may acquire a parameter of the image processing performed by the image processing unit 360 from the storage unit 13 and restore the input image on the basis of the parameter.

The restoration unit 370 may be, for example, a filter with a transfer function like the following formula.

[Math. 4]

$$\hat{H}(u,v) = 1/H(u,v) \quad (4)$$

In the above formula (4), H(u, v) is a transfer function of the filter unit 362 illustrated in FIG. 7.

In addition, the restoration unit 370 may be a filter with a transfer function like the following formula.

[Math. 5]

$$\hat{H}(u, v) = \frac{H*(u, v)}{|H(u, v)|^2 + S_\eta(u, v)/S_f(u, v)} \quad (5)$$

Note that, in the above formula (5), H(u, v) is a transfer function of the filter unit 362 illustrated in FIG. 7. In addition, H*(u, v) is a complex conjugate of H(u, v). In addition, $S_\eta(u, v)$ and $S_f(u, v)$ are power spectral densities of η(x, y) and f(x, y) described with reference to FIG. 7 respectively, if Fourier transforms of η(x, y) and f(x, y) are set to F(u, v) and N(u, v), each of them can be expressed by the following formula.

[Math. 6]

$$S_\eta(u,v)=|N(u,v)|^2 \quad (6)$$

$$S_f(u,v)=|F(u,v)|^2 \quad (7)$$

The restoration unit 370 generates a restored image obtained by restoring the input image by combining, for example, an output result obtained by applying the filter of the above-described transfer function to the processing region with the output image. Note that the processing region on which the restoration unit 370 performs the restoration process may be a region corresponding to the iris region specified by the region specification unit 120, or may be a region specified on the basis of a parameter included in the storage unit 13.

With this configuration, the user can, for example, preserve or publish the output image on which the image processing has been performed by the image processing unit 360, and further can obtain the restored image obtained by restoring the input image from the output image as well.

Note that it is desirable to keep the image processing by the image processing unit 360 and the restoration process by the restoration unit 370 in secret (not to publish the processing methods to a third party). By keeping the image processing by the image processing unit 360 and the restoration process by the restoration unit 370 in secret, it is possible to make it difficult for a third party to restore the input image and thus to prevent false authentication.

3-2. Operation Example

The configuration example of the information processing device 3 according to the third embodiment of the present disclosure has been described above. Next, an operation example of the information processing device 3 according to the present embodiment will be described. Note that, since the operation example of the present embodiment when image processing is performed on an input image is similar to the operation example of the first embodiment described with reference to FIG. 3 except that, for example, the image processing described with reference to FIG. 7 is performed instead of Step S124, description thereof will be omitted.

Figure 8:
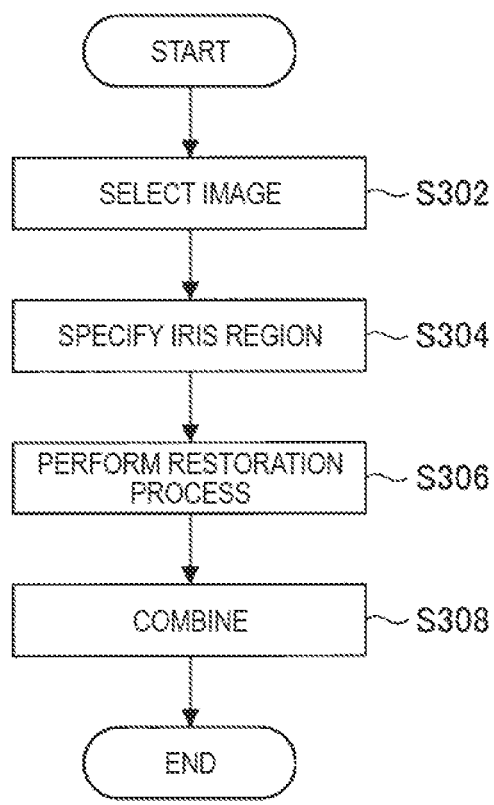
FIG. 8 is an explanatory diagram illustrating an operation example in which an input image is restored from an output image in the embodiment.

An operation example when an input image is restored from an output image will be described in the present embodiment below with reference to FIG. 8. FIG. 8 is an explanatory diagram illustrating the operation example in which an input image is restored from an output image in the present embodiment.

First, an image that is subject to a restoration process (output image) is selected from images stored in the storage unit 13 through a user operation (S302) as illustrated in FIG. 8. Next, the region specification unit 120 specifies an iris region from the image selected in Step S302 (S304). Next, the restoration unit 370 performs the restoration process on the iris region on the basis of a parameter stored in the storage unit 13 related to the image processing (S306), combines the restoration result with an iris region of an output image, and thereby generates a restored image (S308).

The operation example of the present embodiment when the input image is restored from the output image has been described above in detail. Note that the operation illustrated in FIG. 8 is an example, and the present embodiment is not limited thereto. For example, the restoration process may be performed on an image acquired by the communication unit 11 from an external device.

3-3. Effect

As described above, according to the third embodiment of the present disclosure, false authentication can be prevented by performing image processing of changing iris information that can be acquired. In addition, having the restoration unit, the information processing device according to the present embodiment can also obtain a restored image obtained by restoring the input image from the output image on which the image processing has been performed.

3-4. Supplement

Note that, although the example in which the information processing device 3 has both function of the image processing unit and the restoration unit has been described above, the present technology is not limited thereto. The function of the image processing unit and the restoration unit may be provided in, for example, different devices. In addition, in such a case, a parameter of image processing may be provided from the device with the image processing unit to the device with the restoration unit.

4. MODIFIED EXAMPLES

Each of the embodiments of the present disclosure has been described above. Hereinbelow, several modified examples of each embodiment of the present disclosure will be described. Note that each of the modified examples that will be described below may be singly applied to each embodiment of the present disclosure, or may be applied to each embodiment of the present disclosure in combination thereof. In addition, each modified example may be applied instead of the configuration described in each embodiment of the present disclosure, or additionally applied to the configuration described in each embodiment of the present disclosure.

4-1. Modified Example 1

Although, in the above-described embodiments, the blurring process, the edge emphasis process, and the random deformation process have been described as examples of the image processing performed by the image processing unit on the processing region, the present technology is not limited thereto. The image processing unit may perform another kind of image processing on the processing region. As modified example 1, an example in which the image processing unit performs another kind of image processing will be described below.

Figure 9:
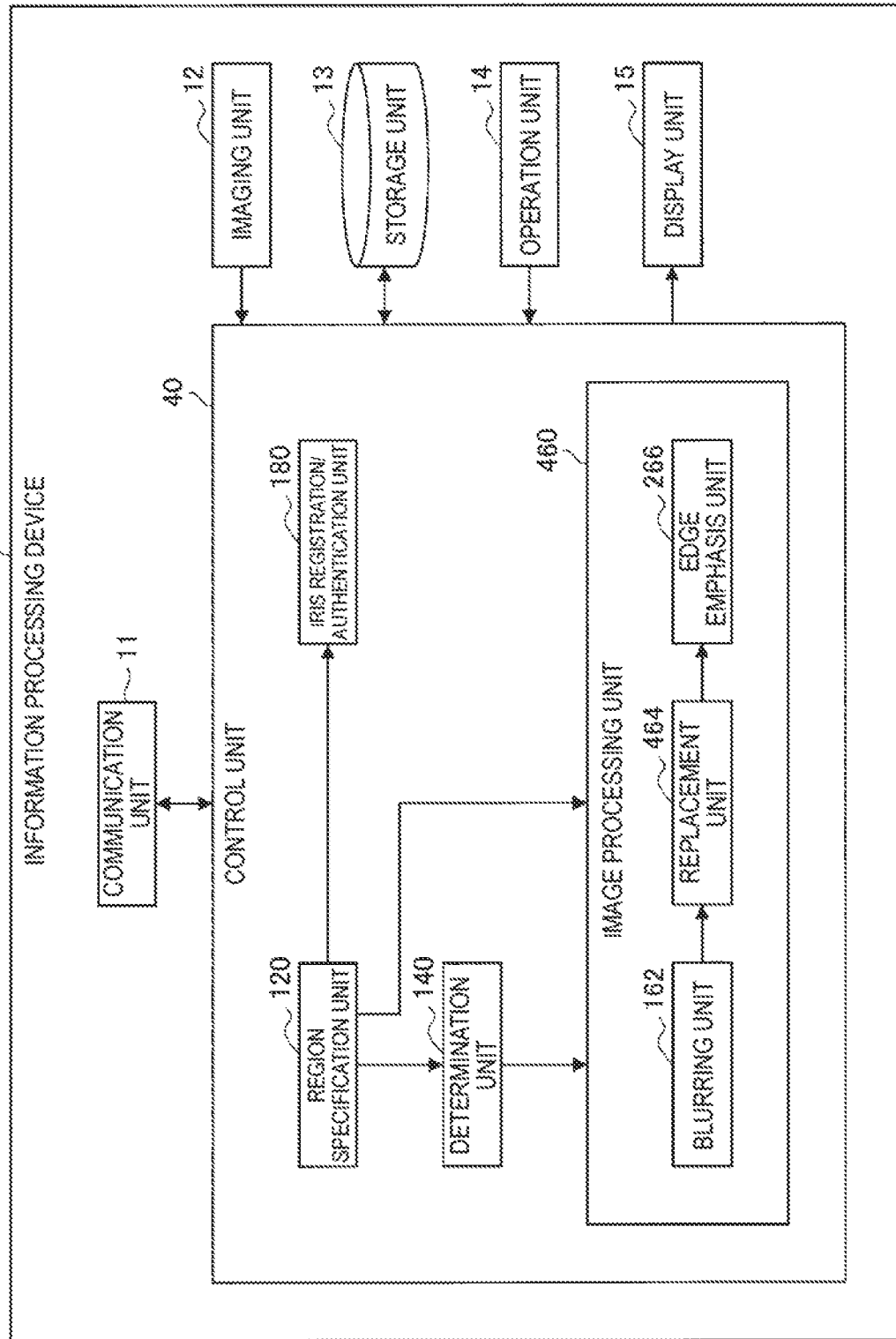
FIG. 9 is a block diagram illustrating a configuration example of an information processing device 4 according to modified example 1.

FIG. 9 is a block diagram illustrating a configuration example of an information processing device 4 according to the modified example 1. As illustrated in FIG. 9, the information processing device 4 according to the modified example is different from the information processing device 2 of FIG. 4 in that some of functional configurations of a control unit 40 are different from the functional configurations of the control unit 20 according to the second embodiment illustrated in FIG. 4. Note that substantially similar configurations among the respective configurations illustrated in FIG. 9 to those illustrated in FIG. 4 are given the same reference numerals, and thus description thereof will be omitted. Functions as an image processing unit 460 included in the control unit 40 according to the modified example will be described below.

The image processing unit 460 performs image processing on a processing region corresponding to an iris region so that iris information that can be acquired from the iris region is changed and thereby generates an output image, similarly to the image processing unit 160 described with reference to FIG. 1 and the image processing unit 260 described with reference to FIG. 4. As illustrated in FIG. 9, the image processing unit 460 according to the present modified example has a function as a replacement unit 464 in addition to the functions as the blurring unit 162 and the edge emphasis unit 266. The function as the replacement unit 464 included in the image processing unit 460 will be described below. Note that image processing performed by the image processing unit 460 according to the present modified example further includes a replacement process by the replacement unit 464 which will be described below, in addition to the blurring process by the blurring unit 162 and the edge emphasis process by the edge emphasis unit 266 described with reference to FIG. 4.

The replacement unit 464 performs a replacement process of replacing an iris region (an example of a processing region) on a processing region. The replacement process may be a process of replacing, for example, an iris region with one iris pattern selected from a plurality of iris patterns (an example of a biological pattern) stored in the storage unit 13 in advance. Note that the iris patterns may be pseudo-generated imitating an iris, or may be generated on the basis of an iris of another captured person.

In addition, the iris pattern may be an iris image, or may be information of an iris design. In a case in which the iris pattern is an iris image, the replacement process performed by the replacement unit 464 may a process of replacing values of all pixels included in the iris region with values of pixels of the iris pattern. In addition, the replacement process performed by the replacement unit 464 may be a process of extracting a design from the iris region and replacing pixels corresponding to the extracted design with values of pixels of the iris pattern.

In addition, the replacement unit 464 may randomly select an iris pattern from the plurality of iris patterns stored in the storage unit 13 in advance and replace the iris region therewith, or may select an iris pattern resembling the iris region and replacing the iris region therewith.

The configuration example according to the present modified example has been described above. Note that an operation of the information processing device 4 according to the present modified example is similar to the operation of the information processing device 2 described with reference to FIG. 5 except that the above-described replacement process is performed instead of the random deformation process (S226) between the blurring process (S224) and the edge emphasis process (S228), and thus description thereof will be omitted.

Modified example 1 has been described above. According to the present modified example, the iris region is replaced with another iris pattern in the replacement process, thus iris information that can be acquired can be changed, and thus false authentication can be prevented.

Note that, although the example in which the image processing unit 460 performs the blurring process and the edge emphasis process before and after the replacement process has been described above, the present modified example is not limited thereto. In a case in which the replacement process is performed with high accuracy (without causing a sense of incongruity), or the like, for example, the image processing unit 460 may not perform the blurring process and the edge emphasis process. In addition, the image processing unit 460 may perform another kind of image processing such as the random deformation process.

4-2. Modified Example 2

Although the examples in which image processing is performed so that iris information that can be acquired from an iris region for iris authentication is changed have been described in the above embodiments, the present technology can be widely applied to biometric authentication other than iris authentication. That is, the above-described iris authentication is an example of biometric authentication, and an iris region is understood as an example of a biological region for biometric authentication. As modified example 2, an application example to another type of biometric authentication will be described below (Example of Fingerprint Authentication)

Figure 10:
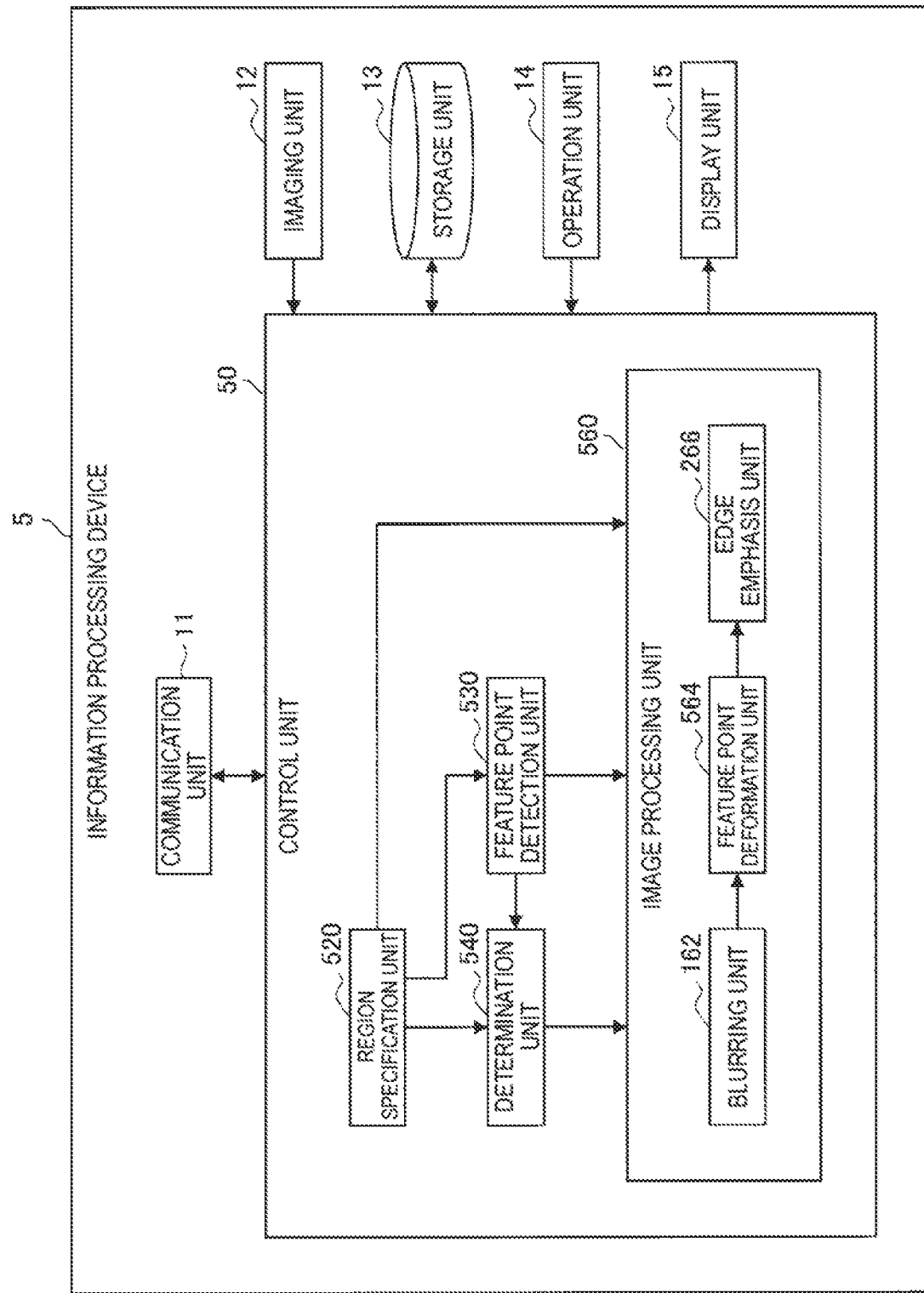
FIG. 10 is a block diagram illustrating a configuration example of an information processing device 5 in which the present technology is applied to fingerprint authentication.

First, an example in which the present technology is applied to fingerprint authentication will be described. FIG. 10 is a block diagram illustrating a configuration example of an information processing device 5 in which the present technology is applied to fingerprint authentication. As illustrated in FIG. 10, the information processing device 5 is different from the information processing device 2 of FIG. 4 in that some of functional configurations of a control unit 50 are different from the functional configurations of the control unit 20 according to the second embodiment illustrated in FIG. 4. Note that, since substantially similar configurations of the respective configurations illustrated in FIG. 10 to those described in FIG. 4 are given the same reference numerals, description thereof will be omitted. Hereinbelow functions as a region specification unit 520, a feature point detection unit 530, a determination unit 540, and an image processing unit 560 included in the control unit 50 will be described.

The region specification unit 520 specifies a biological region from an input image (image data) acquired by the imaging unit 12, similarly to the region specification unit 120 described with reference to FIG. 1. However, the region specification unit 520 is different from the region specification unit 120 in that the former specifies a finger region for fingerprint authentication as a biological region, rather than an iris region. Note that, as the finger region for fingerprint authentication, the region specification unit 520 may specify an entire finger or may specify only a fingertip (at which fingerprints are likely to present). Note that, since no fingerprints are included in the case in which the finger region is a region on the back side of a hand, the region specification unit 520 may specify only a finger region on the palm side of the hand as a finger region for fingerprint authentication. Since specification of the finger region can be realized using a known image recognition technology, detailed description thereof will be omitted here.

Information of the finger region specified by the region specification unit 520 is supplied to the feature point detection unit 530, the determination unit 540, and the image processing unit 560.

Note that image data that is subject to finger region specification by the region specification unit 520 is not limited to images acquired by the imaging unit 12, and may be, for example, an image acquired from an external device via the communication unit 11, or images stored in the storage unit 13 in advance.

The feature point detection unit 530 detects feature points from the finger region specified by the region specification unit 520. The feature points detected by the feature point detection unit 530 may be feature points to be used in fingerprint authentication, or, for example, a center point, a branch point, an end point, a junction point, and the like of a fingerprint pattern. The feature point detection unit 530 provides information regarding the detected feature points (e.g., the number, positions, types, directions, and the like of the detected feature points) to the determination unit 540 and the image processing unit 560.

The determination unit 540 determines whether fingerprint information to be used in fingerprint authentication (an example of biological information) can be acquired from the finger region specified by the region specification unit 520. For example, the determination unit 540 may determine whether fingerprint information can be acquired from the finger region on the basis of information regarding the feature points provided from the feature point detection unit 530. The determination unit 540 may determine whether fingerprint information can be acquired from the finger region by, for example, determining whether a sufficient number of feature points have been detected.

The image processing unit 560 performs image processing on a processing region corresponding to a biological region so that biological information that can be acquired from the biological region is changed and thereby generates an output image, similarly to the image processing unit 160 described with reference to FIG. 1 and the image processing unit 260 described with reference to FIG. 4. However, the image processing unit 560 performs image processing on the processing region corresponding to a finger region so that fingerprint information (an example of biological information) that can be acquired from a finger region (an example of a biological region) specified by the region specification unit 520 is changed, and thereby generates an output image.

In addition, the image processing unit 560 included in the information processing device 5 has a function as a feature point deformation unit 564 in addition to the functions as the blurring unit 162 and the edge emphasis unit 266 as illustrated in FIG. 10. The function of the feature point deformation unit 564 included in the image processing unit 560 will be described below. Note that image processing performed by the image processing unit 560 further includes a feature point deformation process by the feature point deformation unit 564 which will be described below, in addition to the blurring process by the blurring unit 162 and the edge emphasis process by the edge emphasis unit 266 described with reference to FIG. 4.

The feature point deformation unit 564 performs image processing of changing information regarding feature points for authenticating fingerprints detected from a finger region on the finger region (an example of a processing region) (which will also be referred to as a feature point deformation process). For example, the feature point deformation unit 564 may perform the feature point deformation process through movement (coordinate change within the ringer region) or deletion of feature points detected from the finger region by the feature point detection unit 530, or a combination thereof. Note that the feature point deformation unit 564 may not necessarily perform the feature point deformation process on all detected feature points, and may perform the feature point deformation process on some of detected feature points.

The feature point deformation unit 564 may set a feature region around feature points detected from the finger region by the feature point detection unit 530, move the feature region in accordance with movement of the feature points, and thereby generate a pseudo fingerprint pattern (stripes) around the moved feature region. In addition, the feature point deformation unit 564 may set a feature region around feature points detected from the finger region by the feature point detection unit 530, and generate a pseudo fingerprint pattern in the feature region or around the feature region in accordance with deletion of feature points. The feature point deformation unit 564 may perform processing such that a fingerprint pattern originally included in the finger region is lost. FIGS. 11 and 12 are explanatory diagrams illustrating examples of the feature point deformation process by the feature point deformation unit 564.

A finger region F10 illustrated in FIG. 11 is an explanatory diagram for describing feature points detected by the feature point detection unit 530 and feature regions set around the feature points. A position P11 and a position P12 respectively represent positions of the detected feature points, and feature regions R11 and R12 are respectively set around the positions P11 and P12.

A schematic diagram M10 illustrated in FIG. 11 schematically illustrates movements of the feature points by the feature point deformation unit 564. In the example illustrated in FIG. 11, the feature point deformation unit 564 moves the feature point of the position P11 to a position P21 and the feature point of the position P12 to a position P22.

A finger region F20 illustrated in FIG. 11 is an explanatory diagram for describing movement of the feature regions in accordance with the movements of the feature points by the feature point deformation unit 564 and generation of pseudo fingerprint patterns. In the example illustrated in FIG. 11, the above-described feature regions R11 and R12 are moved in accordance with the movements of the feature points of the position P11, P12 in the finger region F10 and are illustrated as feature regions R21 and R22 around the positions P21 and P22 after the movement. Furthermore, pseudo fingerprint patterns (stripes) are generated around the feature regions R21 and R22 by the feature point deformation unit 564.

Description of a finger region F10 illustrated in FIG. 12 will be omitted since it is similar to the finger region F10 illustrated in FIG. 11. A schematic diagram M20 illustrated in FIG. 12 illustrates movement and deletion of the feature points by the feature point deformation unit 564. In the example illustrated in FIG. 12, the feature point deformation unit 564 deletes the feature point of the position P11 and moves the feature point of the position P12 to a position P32.

A finger region F30 illustrated in FIG. 12 is an explanatory diagram for describing movement of a feature region in accordance with movement of a feature point by the feature point deformation unit 564 and generation of a pseudo fingerprint pattern. In the example of the finger region F30 illustrated in FIG. 12, the feature region R11 is deleted in accordance with the above-described deletion of the feature point of the position P11 in the finger region F10. In addition, the feature region R12 is moved in accordance with the above-described movement of the feature point of the position P12 in the finger region F30 and is illustrated as a feature region R32 around a position P32 after the movement. Furthermore, a pseudo fingerprint pattern (stripe) is generated around the feature region R32 by the feature point deformation unit 564.

The feature point deformation process by the feature point deformation unit 564 has been described above. Note that, although the example in which movement of feature points and movement and deletion of feature points are performed as the feature point deformation process has been described in FIGS. 11 and 12, a case in which only deletion of a feature point is performed is also included in the feature point deformation process.

Figure 13:
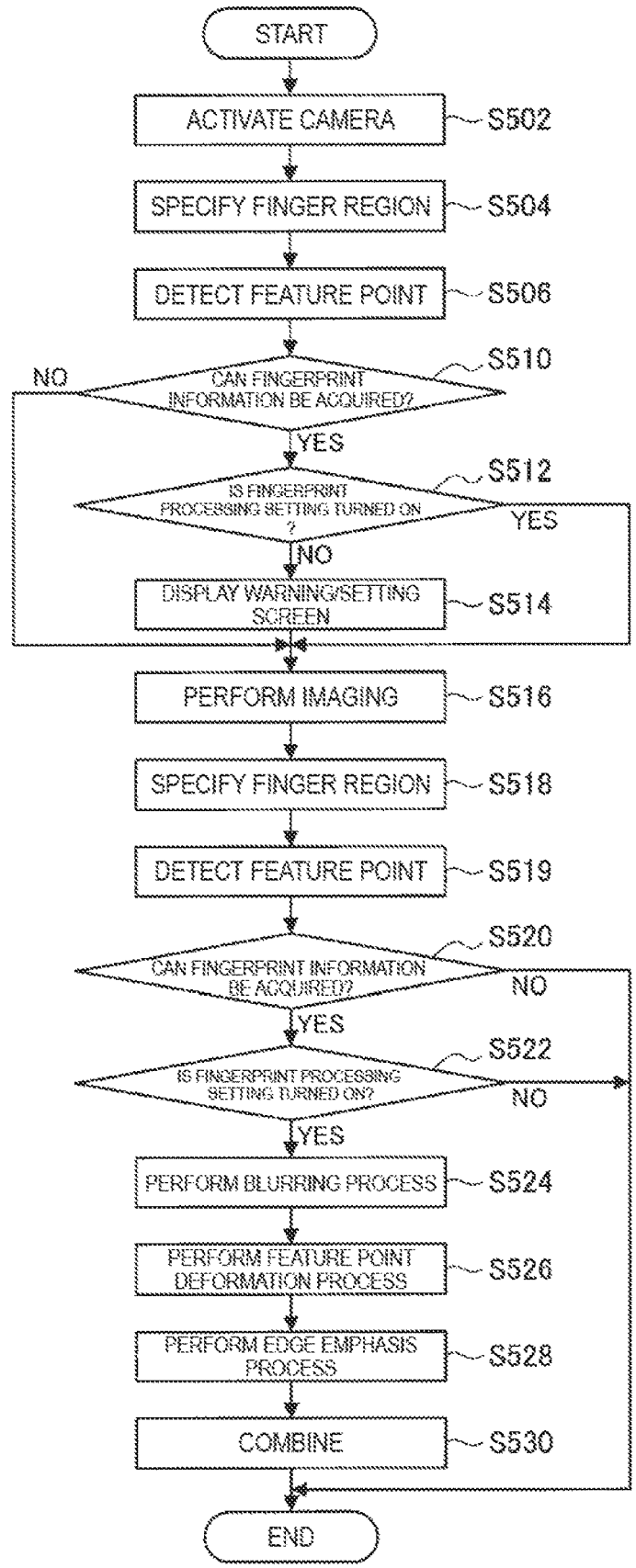
FIG. 13 is an explanatory diagram illustrating an operation example of the information processing device 5.

The configuration example of the information processing device 5 has been described above. Next, an operation example of the information processing device 5 will be described. FIG. 13 is an explanatory diagram illustrating an operation example of the information processing device 5 illustrated in FIG. 10.

As illustrated FIG. 13, a camera (the imaging unit 12) is activated through a user operation (S502). Next, the region specification unit 520 specifies a finger region from an image acquired by the imaging unit 12 (S504), and the feature point detection unit 530 detects a feature point from the specified finger region (S506). Furthermore, the determination unit 540 determines whether fingerprint information can be acquired from the finger region specified in Step S506 on the basis of the feature point detected in Step S506 (S510).

In a case in which it is determined that fingerprint information can be acquired and a fingerprint processing setting is turned off (YES in S510 and NO in S512), the control unit 50 urges the user to turn on the fingerprint processing setting and causes the display unit 15 to display a warning/setting screen for switching the fingerprint processing setting (S514). After a user operation is performed on the warning/setting screen, the process proceeds to Step S516.

On the other hand, in a case in which it is determined that it is not possible to acquire fingerprint information (NO in S510) or it is determined that it is possible to acquire fingerprint information and the fingerprint processing setting is turned on (YES in S510 and YES in S512), the process proceeds to Step S516.

When imaging is executed through a user operation in Step S516, for example, an input image is acquired by the imaging unit 12, and the region specification unit 520 specifies a finger region from the acquired input image (S518). Next, the determination unit 540 determines whether finger information can be acquired from the finger region specified in Step S518 (S520). In a case in which it is determined that it is not possible to acquire finger information (NO in S520) or the iris processing setting is turned off although it is determined that finger information can be acquired (YES in S520 and NO in S522), the process ends.

On the other hand, in a case in which it is determined that fingerprint information can be acquired and the fingerprint processing setting is turned on (YES in S520 and YES in S522), a bluffing unit 562 of the image processing unit 560 performs a blurring process on the finger region (an example of a processing region) extracted from the input image (S524). Next, the feature point deformation unit 564 of the image processing unit 560 performs the feature point deformation process on the finger region (an example of a processing region) to change information regarding a feature point detected from the finger region (S526).

Next, the edge emphasis unit 266 of the image processing unit 560 performs an edge emphasis process of emphasizing an edge (contour) on the finger region (S528). Furthermore, the image processing unit 560 combines the result obtained by performing the processes of Steps S524 to S528 on the finger region with the finger region of the input image and thereby generates an output image (S530).

According to the information processing device 5 described above, by performing image processing to change fingerprint information that can be acquired, false authentication can be prevented even in a case in which fingerprint authentication is used as biometric authentication.

Note that, although the example in which the image processing unit 560 performs the blurring process, the feature point deformation process, and the edge emphasis process has been described above, the present technology is not limited thereto. For example, image processing by the image processing unit 560 may include the random deformation process described with reference to FIG. 4 or include the replacement process described with reference to FIG. 9. Note that, in a case in which the image processing unit 560 performs the replacement process, a plurality of fingerprint patterns may be stored in the storage unit 13, and the image processing unit 560 may replace a processing region with one fingerprint pattern selected from the plurality of fingerprint patterns.

(Example of Vein Authentication)

Figure 14:
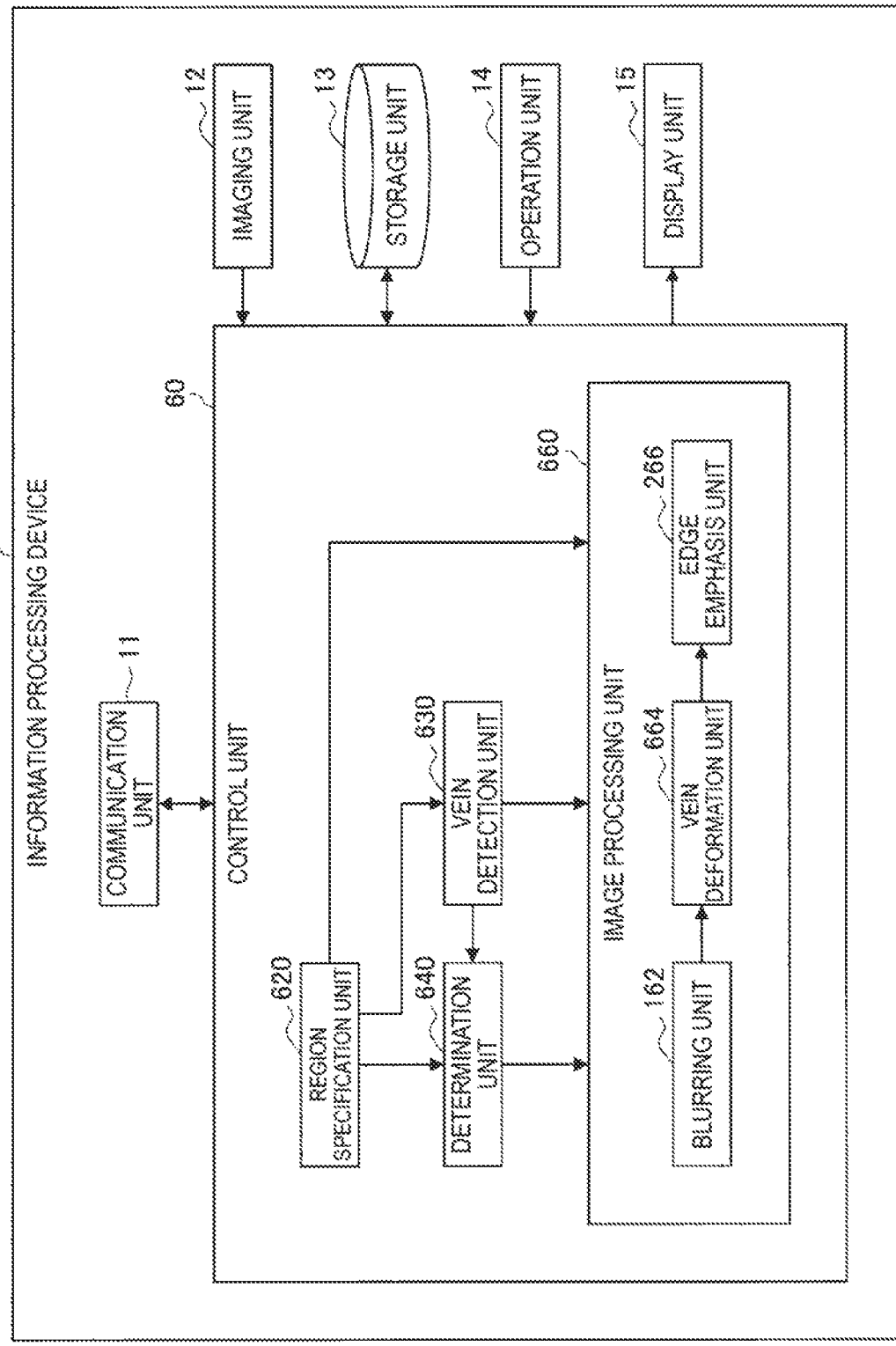
FIG. 14 is a block diagram illustrating a configuration example of an information processing device 6 in which the present technology is applied to vein authentication.

Next, an example in which the present technology is applied to vein authentication (example of biometric authentication) will be described. FIG. 14 is a block diagram illustrating a configuration example of an information processing device 6 in which the present technology is applied to vein authentication. As illustrated in FIG. 14, the information processing device 6 is different from the information processing device 2 of FIG. 4 in that some of functional configurations of a control unit 60 are different from the functional configurations of the control unit 20 according to the second embodiment illustrated in FIG. 4. Note that, since substantially similar configurations of the respective configurations illustrated in FIG. 14 to those described in FIG. 4 are given the same reference numerals, description thereof will be omitted. Hereinbelow, functions as a region specification unit 620, a vein detection unit 630, a determination unit 640, and an image processing unit 660 included in the control unit 60 will be described.

The region specification unit 620 specifies a finger region (an example of a biological region) from an input image (image data) acquired by the imaging, unit 12, similarly to the region specification unit 520 described with reference to FIG. 10. However, since the region specification unit 620 specifies a finger region for vein authentication, the region specification unit may specify an entire finger as a finger region. Since the specification of the finger region can be realized using a known image recognition technology, detailed description thereof will be omitted here.

Information of the finger region specified by the region specification unit 620 is supplied to the vein detection unit 630, the determination unit 640, and the image processing unit 660.

Note that image data that is subject to finger region specification by the region specification unit 620 is not limited to images acquired by the imaging unit 12, and may be, for example, an image acquired from an external device via the communication unit 11, or images stored in the storage unit 13 in advance.

The vein detection unit 630 detects a vein from the finger region specified by the region specification unit 620. Since the detection of the vein can be realized using a known image recognition technology, detailed description thereof will be omitted here. The vein detection unit 630 provides information regarding the detected vein (e.g., the number, a position, a type, a direction, a length, and the like of the detected vein) to the determination unit 640 and the image processing unit 660.

The determination unit 640 determines whether vein information to be used in vein authentication can be acquired from the finger region specified by the region specification unit 620. For example, the determination unit 640 may determine whether information can be acquired from the finger region on the basis of information regarding the vein provided from the vein detection unit 630. The determination unit 640 may determine whether vein information can be acquired from the finger region by, for example, determining whether a sufficient number of veins have been detected.

The image processing unit 660 performs image processing on a processing region corresponding to a biological region so that biological information that can be acquired from the biological region is changed and thereby generates an output image, similarly to the image processing unit 160 described with reference to FIG. 1 and the image processing unit 260 described with reference to FIG. 4. However, the image processing unit 660 performs image processing on the processing region corresponding to a finger region so that vein information (an example of biological information) that can be acquired from a finger region (an example of a biological region) specified by the region specification unit 620 is changed, and thereby generates an output image.

In addition, the image processing unit 660 included in the information processing device 6 has a function as a vein deformation unit 664 in addition to the functions as the bluffing unit 162 and the edge emphasis unit 266 as illustrated in FIG. 14. The function of the vein deformation unit 664 included in the image processing unit 660 will be described below. Note that image processing performed by the image processing unit 660 further includes a vein deformation process by the vein deformation unit 664 which will be described below, in addition to the blurring process by the blurring unit 162 and the edge emphasis process by the edge emphasis unit 266 described with reference to FIG. 4.

The vein deformation unit 664 performs image processing on the finger region (an example of a processing region) to change the intimation regarding the vein detected from the finger region (which will be referred to as a vein deformation process). For example, the vein deformation unit 664 may perform the vein deformation process through movement (coordinate change within the finger region), deletion, or a change of a length of the vein detected from the finger region by the vein detection unit 630 or a combination thereof. Note that the vein deformation unit 664 may not necessarily perform the vein deformation process on all detected veins, and may perform the vein deformation process on some of detected veins. FIG. 15 is an explanatory diagram illustrating an example of the vein deformation process by the vein deformation unit 664.

In a finger region F40 of FIG. 15, a vein V40 is shown as an example of the vein detected by the vein detection unit 630. The vein deformation unit 664 may change a length of the vein V40, for example, as in the finger region F41 illustrated in FIG. 15. In addition the vein deformation unit 664 may move the vein V40 as in a finger region F42 illustrated in FIG. 15. Note that, when moving the vein V40, the vein deformation unit 664 may move the vein V40 by reversing or rotating the vein. In addition, the vein deformation unit 664 may delete the vein V40 as in a finger region F43 illustrated in FIG. 15.

The vein deformation process by the vein deformation unit 664 has been described above. Note that, although the example in which movement (coordinate change within the finger region) and deletion of the vein or a change of the length thereof are performed as the vein deformation process has been described in FIG. 15, a combination thereof is also included in the vein deformation process.

Figure 16:
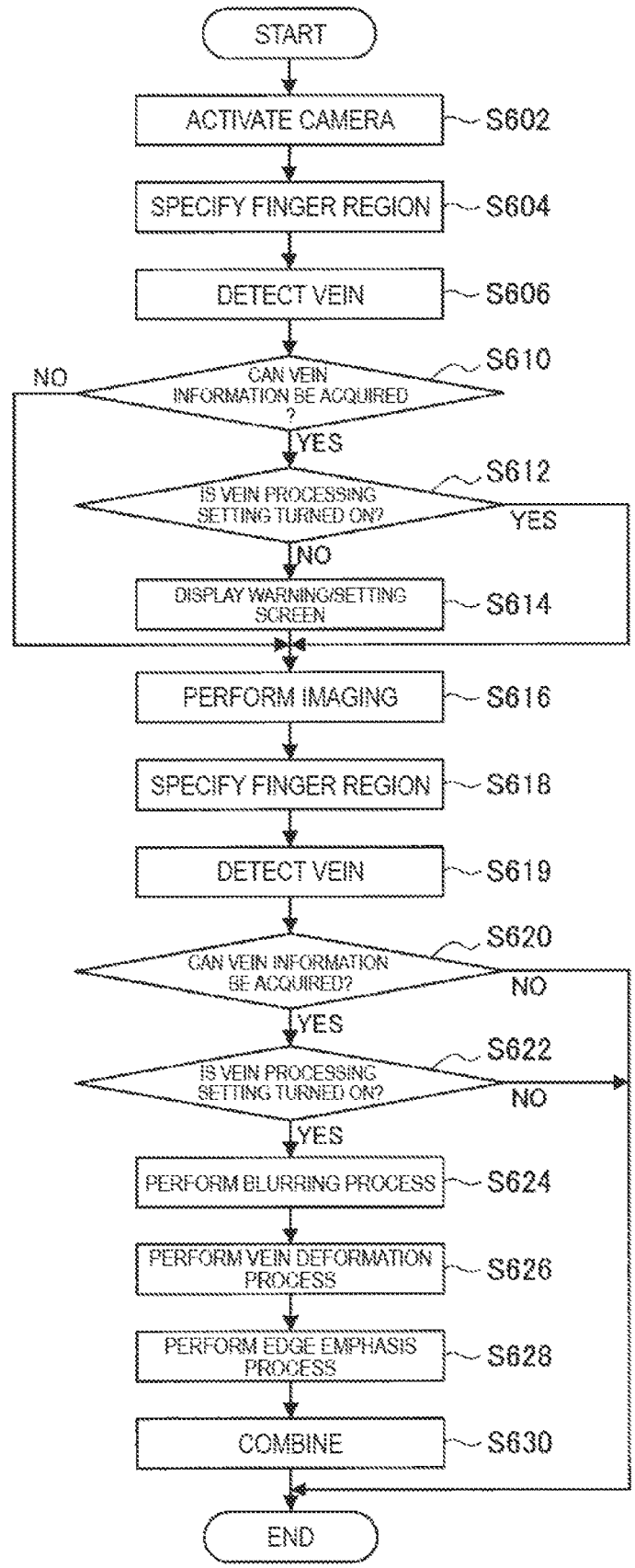
FIG. 16 is an explanatory diagram illustrating an operation example of the information processing device 6.

The configuration example of the information processing device 6 has been described above. Next, an operation example of the information processing device 6 will be described. FIG. 16 is an explanatory diagram illustrating an operation example of the information processing device 6 illustrated in FIG. 14.

As illustrated in FIG. 16, a camera (the imaging unit 12) is activated through a user operation (5602). Next, the region specification unit 620 specifies a finger region from an image acquired by the imaging unit 12 (S604), and the vein detection unit 630 detects a vein from the specified finger region (S606). Furthermore, the determination unit 640 determines whether vein information can be acquired from the finger region specified in Step S606 on the basis of the feature point detected in Step S606 (S610).

In a case in which it is determined that vein information can be acquired and a vein processing setting is turned off (YES in S610 and NO in S612), the control unit 60 urges the user to turn on the vein processing setting and causes the display unit 15 to display a warning/setting screen for switching the vein processing setting (S614). After a user operation is performed on the warning/setting screen, the process proceeds to Step S616.

On the other hand, in a case in which it is determined that it is not possible to acquire vein information (NO in S610) or it is determined that it is possible to acquire vein information and the vein processing setting is turned on (YES in S610 and YES in S612), the process proceeds to Step S646.

When imaging is executed through a user operation in Step S616, for example, an input image is acquired by the imaging unit 12, and the region specification unit 620 specifies a finger region from the acquired input image (S618). Next, the determination unit 640 determines whether vein information can be acquired from the finger region specified in Step S618 (S620). In a case in which it is determined that it is not possible to acquire vein information (NO in S620) or the vein processing setting is turned off although it is determined that vein information can be acquired (YES in S620 and NO in S622), the process ends.

On the other hand, in a case in which it is determined that vein information can be acquired and the vein processing setting is turned on (YES in S620 and YES in S622), a blurring unit 662 of the image processing unit 660 performs a bluffing process on the finger region (an example of a processing region) extracted from the input image (S624). Next, the vein deformation unit 664 of the image processing unit 660 performs the vein deformation process on the finger region (an example of a processing region) to change information regarding a vein detected from the finger region (S626).

Next, the edge emphasis unit 266 of the image processing unit 660 performs an edge emphasis process of emphasizing an edge (contour) on the finger region (S628). Furthermore, the image processing unit 660 combines the result obtained by performing the processes of Steps S624 to S628 on the finger region with the finger region of the input image and thereby generates an output image (S630).

According to the information processing device 6 described above, by performing image processing to change vein information that can be acquired, false authentication can be prevented even in a case in which vein authentication is used as biometric authentication.

As described above, the present technology can also be applied to other types of biometric authentication other than iris authentication. Note that the above-described combination of the biological region or biological information with image processing is an example, and the present technology is not limited thereto. For example, the blurring process, the edge emphasis process, the biological pattern replacement process, and the process of changing information regarding a feature point are effective for changing biological information, regardless of a type of a target biological region. In addition, the random deformation process is particularly effective for changing iris information. In addition, deletion and movement of a feature point is particularly effective for changing fingerprint information or vein information.

In addition, the above-described process for changing biological information can be performed selectively or in combination. For example, the region specification unit may be able to specify a plurality of types of biological region, or processes may be subsequently performed so that biological information corresponding to biological regions that can be specified by the region specification unit is changed. For example, in a case of a configuration in which all of the above-described iris information, fingerprint information, and vein information can be changed, the region specification unit attempts to specify all of an iris region, a fingerprint region, and a vein region from an input image. Then, the feature point detection unit, the vein detection unit, the determination unit, and the image processing unit may subsequently perform processes in accordance with biological information corresponding to the biological region specified by the region specification unit, and thereby the biological information that can be acquired may be changed. In addition, there are also cases in which it is desirable to perform a process of deforming a plurality of pieces of biological information depending on content of an input image. For example, image processing of changing both fingerprint information and vein information may be performed on an input image in which a finger is projected. In addition, image processing of changing all of iris information, fingerprint information, and vein information may be performed on an input image in which both a finger and an eye are projected.

4-3. Modified Example 3

Although the examples in which the information processing devices that acquire (capture) images perform specification of biological regions, image processing on the biological regions, and the like have been described in the above embodiments, the present technology is not limited thereto. For example, a device that Acquires an image may be a different device from a device that performs specification of a biological region, image processing on the biological region, and the like, and an example related thereto will be described below as modified example 3.

Figure 17:
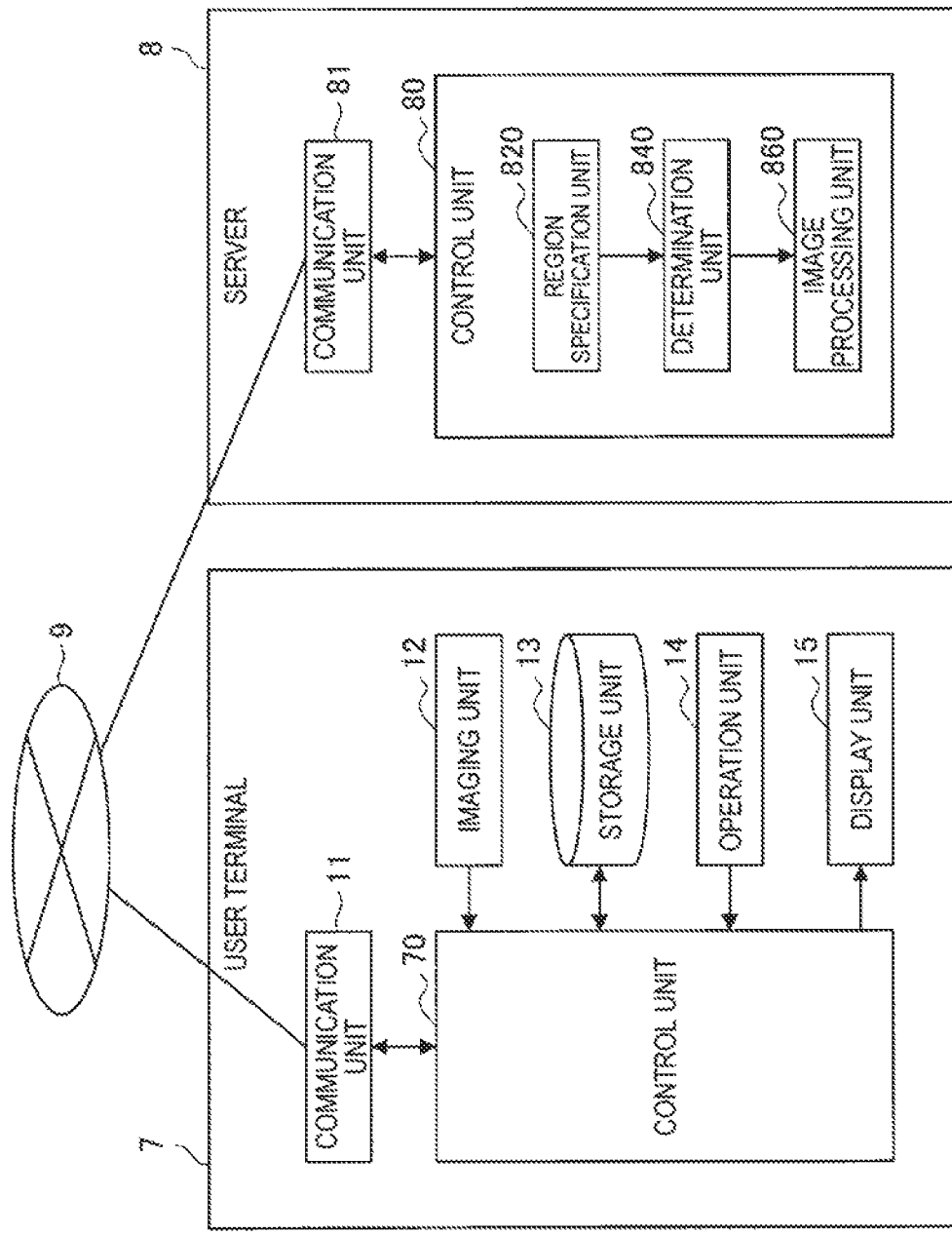
FIG. 17 is a block diagram illustrating a configuration example of an information processing system 1000 according to modified example 3.

FIG. 17 is a block diagram illustrating a configuration example of an information processing system 1000 according to the present modified example. The information processing system 1000 according to the present modified example includes a user terminal 7, a server 8, and a communication network 9 as illustrated in FIG. 17. Note that, since the same reference numerals are given to substantially similar configurations among respective configurations illustrated in FIG. 17 to those illustrated in FIG. 1, description thereof will be omitted.

The user terminal 7 is an information processing device including a communication unit 11, an imaging unit 12, a storage unit 13, an operation unit 14, a display unit 15, and a control unit 70 as illustrated in FIG. 17, and may be, for example, a smartphone, a tablet terminal, or the like. Since functions of the communication unit 11, the imaging unit 12, the storage unit 13, the operation unit 14, and the display unit 15 illustrated in FIG. 17 are similar to the functions of the communication unit 11, the imaging unit 12, the storage unit 13, the operation unit 14, and the display unit 15 described with reference to FIG. 1, description thereof will be omitted.

The control unit 70 controls each of the configurations of the user terminal 7. For example, the control unit 70 has a communication control function of controlling communication by the communication unit 11 and a display control function of controlling display by the display unit 15. In addition, the control unit 70 according to the present modified example has an encryption function of encrypting an input image acquired by the imaging unit 12 and a decryption function of decrypting information received by the communication unit 11.

The server 8 is an information processing device including a communication unit 81 and a control unit 80 as illustrated in FIG. 17. Since a function of the communication unit 81 illustrated in FIG. 17 is similar to that of the communication unit 11 described with reference to FIG. 1 description thereof is omitted.

The control unit 80 controls each of the configurations of the server 8. For example, the control unit 80 has a communication control function of controlling communication by the communication unit 81, an encryption function of encrypting an image, a decryption function of decrypting information received by the communication unit 11, and the like. In addition, the server 8 according to the present modified example may provide a service, for example, a social networking service (SNS), a social medium, or the like, and may also have a function of publishing information such as an image to another device via, the communication network 9. Furthermore, the control unit 80 has functions of a region specification unit 820, a determination unit 840, and an image processing unit 860 as illustrated in FIG. 17.

The region specification unit 820 specifies a biological region for biometric authentication, similarly to the above-described region specification unit 120, region specification unit 520, and region specification unit 620. Note that a function of the region specification unit 820 may be similar to the function of any of the region specification unit 120, the region specification unit 520, and the region specification unit 620 or may be a combination of the functions thereof.

The determination unit 840 determines whether biological information can be specified from the biological region specified by the region specification unit 820, similarly to the above-described determination unit 140, the determination unit 540, and the determination unit 640. Note that a function of the determination unit 840 may be similar to the function of any of the determination unit 140, the determination unit 540, and the determination unit 640, or may be a combination of the functions thereof.

The image processing unit 860 performs image processing on a processing region corresponding to the biological region so that the biological information that can be acquired from the biological region is changed, similarly to the above-described image processing unit 160, the image processing unit 260, the image processing unit 360, the image processing unit 460, the image processing unit 560, and the image processing unit 660. Note that a function of the image processing unit 860 may be similar to the function of any of the image processing unit 160, the image processing unit 260, the image processing unit 360, the image processing unit 460, the image processing unit 560, and the image processing unit 660, or may be a combination of the functions thereof. That is, the image processing performed by the image processing unit 860 may include one or more of the above-described blurring process, edge process, random deformation process, replacement process, feature point deformation process, and vein deformation process.

In addition, although not illustrated in FIG. 17, the control unit 80 may have the functions as a feature point detection unit and a vein detection unit.

The communication network 9 is a wired or wireless transmission path of information transmitted from a device connected to the communication network 9. For example, the communication network 9 may include a public network such as the Internet, a telephone network, or a satellite communication network, various local area networks (LANs) including Ethernet (registered trademark), a wide area network (WAN), or the like. In addition, the communication network 9 may also include a leased line network such as an Internet Protocol-Virtual Private Network (IP-VPN).

Figure 18:
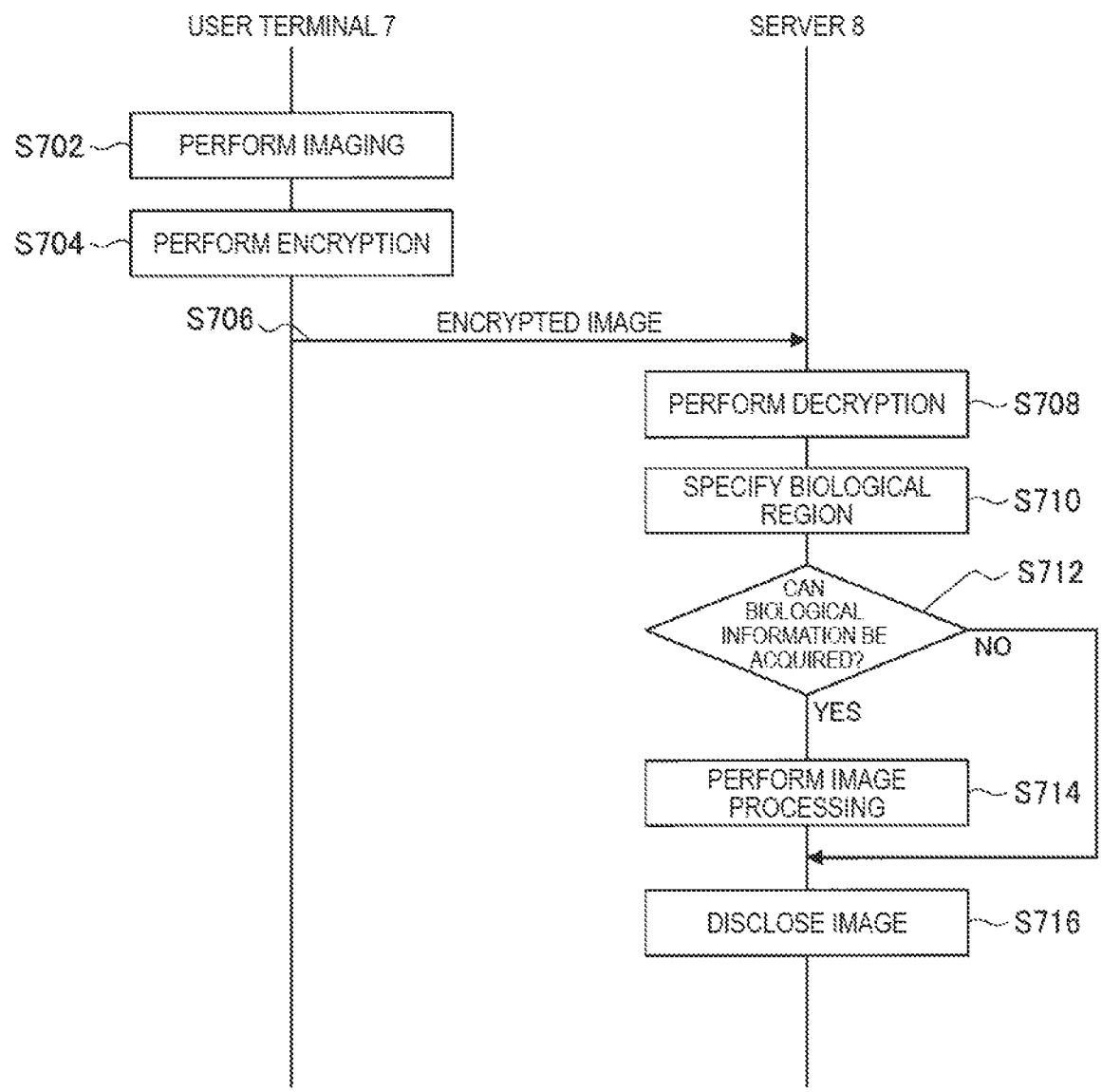
FIG. 18 is a flowchart illustrating an operation example of the modified example.
Figure 19:
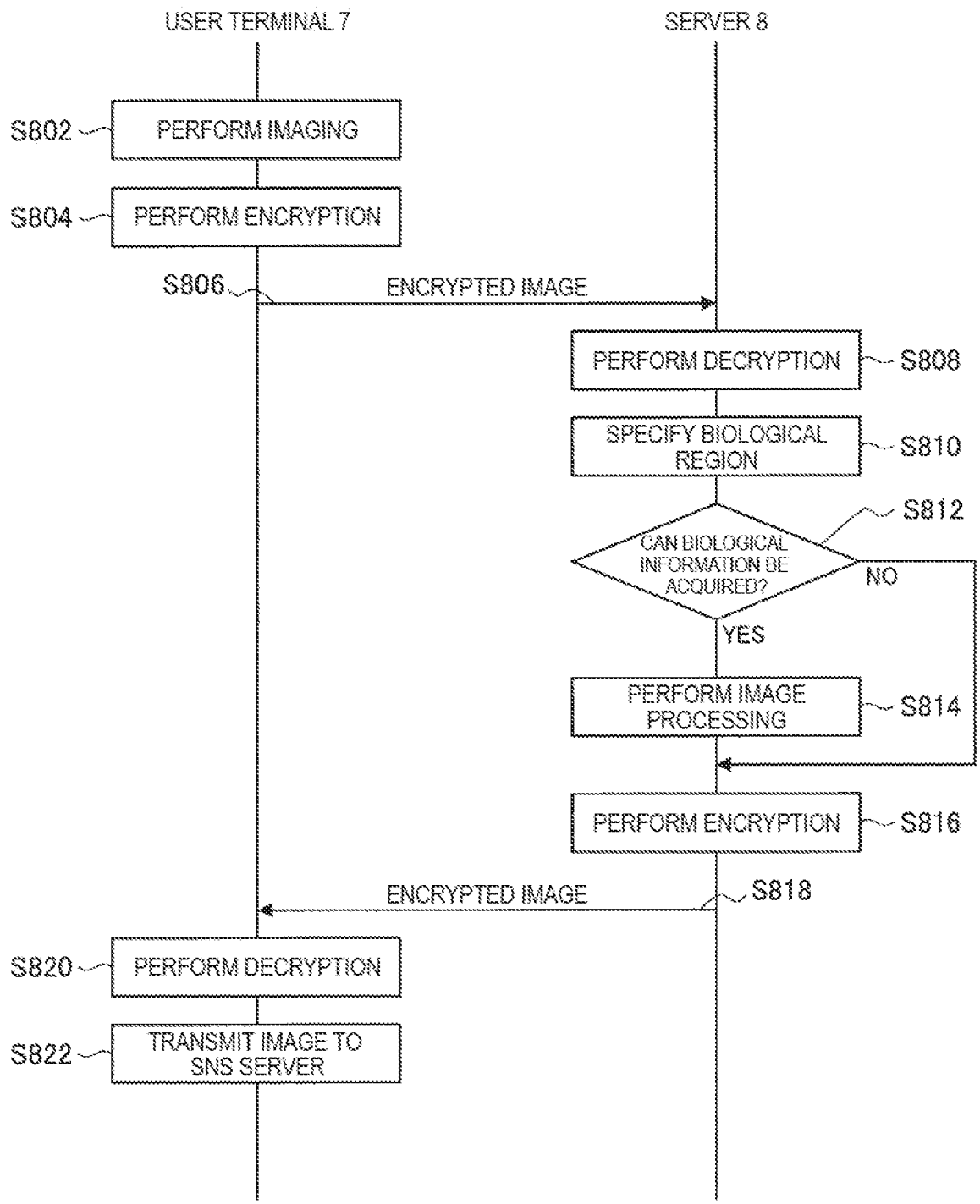
FIG. 19 is a flowchart illustrating an operation example of the modified example.
Figure 20:
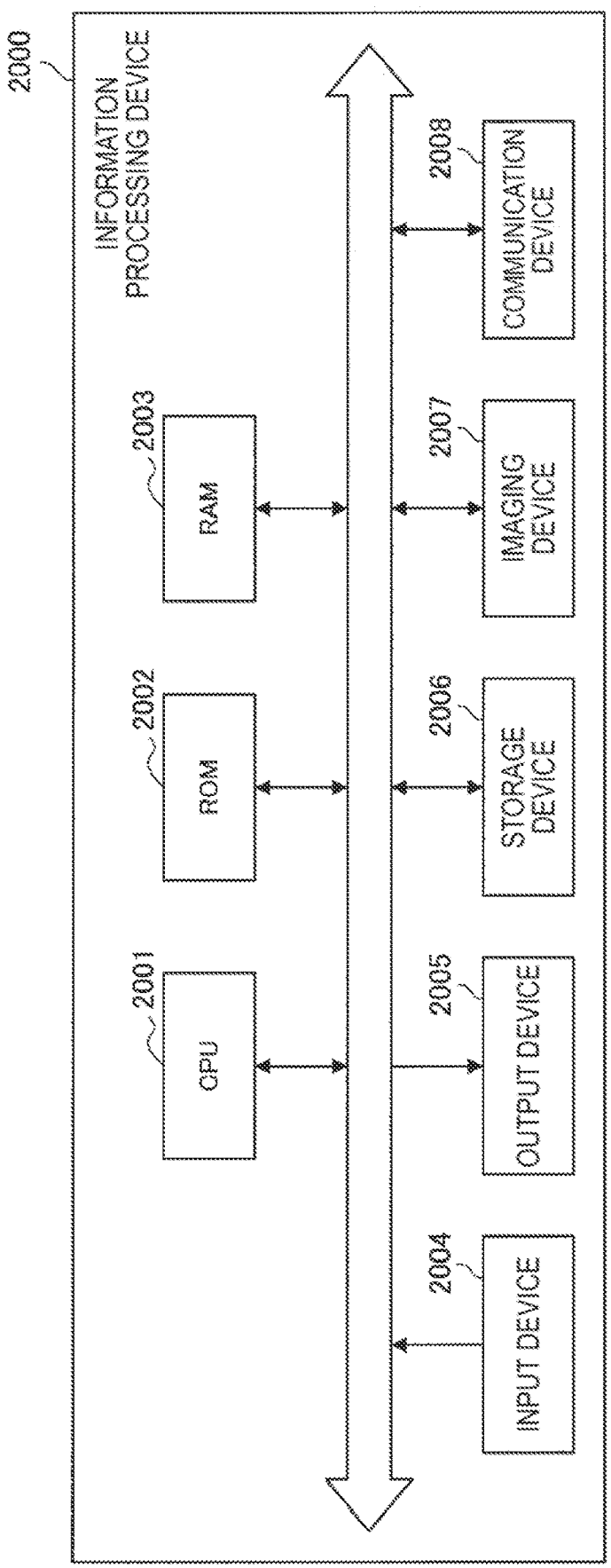
FIG. 20 is an explanatory diagram illustrating a hardware configuration example.

The configuration of the present modified example has been described above. Next, an operation of the present modified example will be described with reference to FIG. 18 and FIG. 19. FIGS. 18 and 19 are flowcharts illustrating respective operation examples of the modified example.

In FIG. 18, the operation example in a case in which the server 8 has a function of providing a service such as a social networking service (SNS) or a social media, and publishing images to other devices, and images are published after undergoing image processing by the server 8 is illustrated. In the example illustrated in FIG. 18, first, when imaging is executed through a user operation, for example, an input image is acquired by the imaging unit 12 of the user terminal 7 (S702). Next, the control unit 70 of the user terminal 7 encrypts the input image (S704), and then the encrypted image is transmitted from the user terminal 7 to the server 8 (S706).

The control unit 80 of the server 8 that has received the encrypted image performs a decoding process to acquire the input image (S708). Next, the region specification unit 820 of the server 8 specifies a biological region from the input image (S710). Next, the determination unit 840 of the server 8 determines whether biological information can be acquired from the biological region specified in Step S710 (S712).

In a case in which it is determined that biological information can be acquired (YES in S712), the image processing unit 860 of the server 8 performs image processing on a processing region corresponding to the biological region so that the biological information that can be acquired from the biological region is changed (S714). Furthermore, the server 8 publishes an output image obtained by performing the image processing in Step S714 to another device via the communication network 9 (S716).

On the other hand, in a case in which it is determined that it is not possible to acquire biological information (NO in S712), the server 8 publishes the input image to another device via the communication network 9, without performing image processing on the input image (S716).

In addition, in the example illustrated in FIG. 19, an operation example in a case in which the server 8 may not have the function of publishing an image to another device, and after the server 8 performs image processing, the user terminal 7 transmits an image to another server (e.g., an SNS server not illustrated) having an image publishing function is illustrated. Since the processes of Steps S802 to S810 illustrated in FIG. 19 are similar to the processes of Steps S702 to S710 described with reference to FIG. 18, description thereof is omitted.

Next, in Step S812, the determination unit 840 of the server 8 determines whether biological information can be acquired from the biological region specified in Step S810.

In a case in which it is determined that biological information can be acquired (YES in S812), the image processing unit 860 of the server 8 performs image processing on a processing region corresponding to the biological region so that the biological information that can be acquired from the biological region is changed (S814). Furthermore, the server 8 encrypts an output image obtained by performing the image processing in Step S814 (S816).

On the other hand, in a case in which it is determined that it is not possible to acquire biological information (NO in S812), the server 8 encrypts the input image, without performing image processing on the input image (S816).

Next, the image encrypted in Step S816 is transmitted from the server 8 to the user terminal 7 (S818), and then decoded in the user terminal 7 (S820). Next, the user terminal 7 transmits an image obtained in the decryption in Step S820 to an SNS server which is not illustrated (S822).

Note that the operations illustrated in FIGS. 18 and 19 are examples, and the present technology is not limited thereto. For example, in a case in which it is determined that it is not possible to acquire biological information in Step S812, information indicating that no image processing is necessary is transmitted from the server 8 to the user terminal 7, and the user terminal 7 may transmit the input image obtained in Step S802 to an SNS server which is not illustrated.

5. HARDWARE CONFIGURATION EXAMPLE

Respective embodiments and modified examples of the present disclosure have been described above. The above-described information processing including region specification process, determination process, image processing, iris registration/authentication process, restoration process, and the like are realized in cooperation with software and hardware of the information processing, devices 1 to 3. Hereinbelow, a hardware configuration example of an information processing device 2000 will be described as hardware configuration examples of the information processing devices 1 to 6, the user terminal 7, and the server 8 that are information processing devices according to the present embodiment.

FIG. 9 is an explanatory diagram illustrating a hardware configuration example of the information processing device 2000. As illustrated in FIG. 9, the information processing device 2000 includes a central processing unit (CPU) 2001, a read only memory (ROM) 2002, a random access memory (RAM) 2003, an input device 2004, an output device 2005, a storage device 2006, an imaging device 2007, and a communication device 2008.

The CPU 2001 functions as an arithmetic processing device and a control device, and controls overall operations performed in the information processing device 2000 in accordance with various programs. In addition, the CPU 2001 may be a microprocessor. The ROM 2002 stores programs, arithmetic parameters, and the like to be used by the CPU 2001. The RAM 2003 temporarily stores programs to be used in execution of the CPU 2001, parameters that are appropriately changed in the execution, and the like. The elements are connected to one another by a host bus composed of a CPU bus or the like. Mainly in cooperation with the CPU 2001, the ROM 2002 and the RAM 2003 and software, the functions of the control unit 10, the control unit 20, the control unit 30, the control unit 40, the control unit 50, the control unit 60, the control unit 70, and the control unit 80 are realized.

The input device 2004 is constituted by input means for a user to input information such as a mouse, a keyboard, a touch panel, a button, a microphone, a switch, and a lever, an input control circuit that generates input signals on the basis of input by the user and outputs the input signal to the CPU 2001, and the like. By operating the input device 2004, the user of the information processing device 2000 can input various kinds of data or instruct processing operations to the information processing device 2000.

The output device 2005 includes a display device, for example, a liquid crystal display (LCD) device, an OLED device, a see-through display, a lamp, or the like. Furthermore, the output device 2005 includes an audio output device such as a speaker or a headphone. The display device displays, for example, captured images, generated images, and the like. Meanwhile, the audio output device converts audio data or the like into a sound and outputs the sound. The output device 2005 corresponds to, for example, the display unit 15 described with reference to FIG. 1.

The storage device 2006 is a device for data storage. The storage device 2006 may also include a storage medium, a recording device that records data in the storage medium, a reading device that reads data from the storage medium, a deletion device that deletes data recorded in the storage medium, and the like. The storage device 2006 stores programs executed by the CPU 2001 and various kinds of data. The storage device 2006 corresponds to the storage unit 13 described with reference to FIG. 1.

The imaging device 2007 includes an imaging optical system such as an imaging lens and a zoom lens that collect light and a signal conversion element such as a charge coupled device (CCD) or a complementary metal oxide semiconductor (CMOS). The imaging optical system collects light emitted from a subject and forms a subject image on a signal conversion unit, and the signal conversion element converts the formed subject image into an electrical image signal. The imaging device 2007 corresponds to the imaging unit 12 described with reference to FIG. 1.

The communication device 2008 is a communication interface constituted by, for example, a communication device for connecting to a communication network, or the like. In addition, the communication device 2008 may include a wireless local area network (LAN) compatible communication device, a Long Term Evolution (LTE) compatible communication device, a wired communication device that performs communication through wires, or a Bluetooth (registered trademark) communication device. The communication device 2008 corresponds to, for example, the communication unit 11 described with reference to FIG. 1 and the communication unit 81 described with reference to FIG. 17.

6. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, each step according to the above-mentioned embodiments does not always need to be processed in time series in the order described as the flowcharts. For example, each step in the processing according to the above-mentioned embodiments may be processed in order different from that described as the flowcharts, or be processed in parallel.

In addition, according to the embodiments, a computer program for causing the hardware such as the CPU 2001, the ROM 2002, and the RAM 2003 to exhibit functions similar to those of the respective configurations of the above-described information processing devices 1 to 6, the user terminal 7, and the server 8 can also be provided. In addition, a recording medium in which the computer program is recorded may also be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a region specification unit configured to specify a biological region for biometric authentication from image data; and
an image processing, unit configured to perform image processing on a processing region corresponding to the biological region such that biological information acquirable from the biological region is changed.

(2)
The information processing device according to (1), in which the image processing performed by the image processing unit includes a blurring process.

(3)
The information processing device according to (2), in which the image processing performed by the image processing unit further includes an edge emphasis process.

(4)
The information processing device according to (3), in which the image processing performed by the image processing unit further includes a process of chanting a value of a randomly selected pixel.

(5)
The information processing device according to any one of (1) to (4), in which the image processing performed by the image processing unit includes a replacement process of replacing the processing region.

(6)
The information processing device according to (5), in which the replacement process is a process of replacing the processing region with one biological pattern selected from a plurality of biological patterns stored in advance.

(7)
The information processing device according to any one of (1) to (6), in which the image processing performed by the image processing unit includes a feature point deformation process of changing information regarding a feature point detected from the biological region.

(8)
The information processing device according to (7), in which the feature point deformation process includes at least one of movement and deletion of a feature point detected from the biological region.

(9)

The information processing device according to any one of (1) to (8), in which the image processing performed by the image processing unit includes a vein deformation process of changing information regarding a vein detected from the biological region.

(10)

The information processing device according to (9), in which the vein deformation process includes at least one of movement, deletion, and change of a length of the vein.

(11)

The information processing device according to any one of (1) to (10), further including:
a determination unit configured to determine whether the biological information is acquirable from the biological region,
in which the image processing unit performs the image processing on the processing region in a case in which the determination unit determines that the biological information is acquirable from the biological region.

(12)

The information processing, device according to any one of (1) to (10), further including:
a determination unit configured to determine whether biological information is acquirable from the biological region specified by the region specification unit,
in which, in a case in which the determination unit determines that the biological information is acquirable from the biological region, a warning screen is displayed.

(13)

The information processing device according to (12), further including:
a communication unit configured to perform communication with an outside,
in which, in a case in which an operation input for causing image data to be transmitted to an outside is performed, the determination unit determines whether the biological information is acquirable from a biological region specified from the image data.

(14)

The intimation processing device according to any one of (11) to (13), in which the determination unit determines whether the biological information is acquirable from the biological region on a basis of a size of the biological region.

(15)

The information processing device according to any one of (11) to (14), in which the determination unit determines whether the biological information is acquirable from the biological region on a basis of color included in the biological region.

(16)

The information processing device according to any one of (1) to (15), further including:
a restoration unit configured to restore the image data from an image obtained by performing the image processing on the processing region.

(17)

The information processing device according to (16), in which the restoration unit restores the image data on a basis of a parameter of the image processing.

(18)

The information processing device according to any one of (1) to (17), in which the biological information includes at least one of iris information, fingerprint information, and vein information.

(19)

An information processing method including:
specifying a biological region for biometric authentication from image data and
performing image processing on a processing region corresponding to the biological region such that biological information acquirable from the biological region is changed.

(20)

A program for causing a computer to achieve:
a function of specifying a biological region for biometric authentication from image data; and
a function of performing image processing on a processing region corresponding to the biological region such that biological information acquirable from the biological region is changed.

REFERENCE SIGNS LIST 1, 2, 3, 4, 5, 6 information processing device
7 user terminal
8 server
9 communication network
10, 20, 30, 40, 50, 60, 70, 80 control unit
11 communication unit
12 imaging unit
13 storage unit
14 operation unit
15 display unit
120, 520, 620, 820 region specification unit
140, 540, 640, 840 determination unit
160, 260, 360, 460, 560, 660, 860 image processing unit
162, 562, 662 blurring unit
$\lambda$iris registration/authentication unit
264 random deformation unit
266 edge emphasis unit
362 filter unit
364 addition unit
370 restoration unit
464 replacement unit
530 feature point detection unit
564 feature point deformation unit
630 vein detection unit
664 vein deformation unit

The invention claimed is:

1. An information processing device comprising:
specification circuitry configured to specify a biological region for biometric authentication from through image data;
determination circuitry configured to determine whether biological information is acquirable from the biological region specified by the specification circuitry; and
processing circuitry configured to receive the determination from the determination circuitry, wherein
on condition that the biological information is acquirable from the biological region and a processing setting for obscuring the biological information is on, the processing circuitry is configured to alter only a portion of the biological region in the through image data acquired by a camera.

2. The information processing device according to claim 1, further comprising:
communication circuitry configured to communicate with an outside,
on condition that an operation input for causing image data to be transmitted to an outside is performed, the determination circuitry is configured to determine whether the biological information is acquirable from the biological region specified.

3. The information processing device according to claim 1, wherein the determination circuitry is configured to determine whether the biological information is acquirable from the biological region based on a size of the biological region.

4. The information processing device according to claim 1, wherein the determination circuitry is configured to determine whether the biological information is acquirable from the biological region based on color included in the biological region.

5. The information processing device according to claim 1, wherein the biological information includes at least one of iris information, fingerprint information, and vein information.

6. The information processing device according to claim 1, wherein, on condition that the determination circuitry determines that the biological information is acquirable from the biological region and the processing setting for obscuring the biological information is off, the processing circuitry is configured to output a warning.

7. The information processing device according to claim wherein the through image data is received from a camera.

8. The information processing device according to claim 7, wherein, when the camera is activated by a user operation, the user is allowed to select either a registration/authentication mode or an imaging mode to be received by the information processing device.

9. A non-transitory computer readable storage device having computer readable instructions that when executed by circuitry cause the circuitry to:
specify a biological region for biometric authentication from through image data; and
determine whether biological information is acquirable from the biological region specified, wherein,
on condition that the biological information is acquirable from the biological region and a processing setting for obscuring the biological information is on, the through image is acquired by a camera and supplied to the circuitry, wherein the circuitry is configured to alter only a portion of the biological region in the through image.

10. The non-transitory computer readable storage device as claimed in claim 9, wherein the through image data is received from a camera.

11. The non-transitory computer readable storage device as claimed in claim 10, when the camera is activated by a user operation, the user is allowed to select either a registration/authentication mode or an imaging mode to be received by the circuitry.

12. The non-transitory computer readable storage device as claimed in claim 9, wherein, on condition that the biological information is acquirable from the biological region and the processing setting for obscuring the biological information is off, the circuitry outputs a warning.

13. The non-transitory computer readable storage device as claimed in claim 9, wherein the circuitry is to
communicate with an outside, wherein, on condition an operation input for causing image data to be transmitted to an outside is performed, the circuitry is configured to determine whether the biological information is acquirable from a biological region specified.

14. The non-transitory computer readable storage device as claimed in claim 9, wherein whether the biological information is acquirable from the biological region is determined on a basis of a size of the biological region.

15. The non-transitory computer readable storage device as claimed in claim 9, wherein whether the biological information is acquirable from the biological region is determined on a basis of color included in the biological region.

16. The non-transitory computer readable storage device as claimed in claim 9, wherein the biological information includes at least one of iris information, fingerprint information, and vein information.

17. A non-transitory computer readable storage device having computer readable instructions that when executed by circuitry cause the circuitry to:
specify a biological region for biometric authentication from through image data; and
determine whether biological information is acquirable from the biological region specified, wherein,
on condition that the biological information is acquirable from the biological region and a processing setting for obscuring the biological information is off, the circuitry outputs a warning.

18. An information processing device comprising:
specification circuitry configured to specify a biological region for biometric authentication from through image data;
determination circuitry configured to determine whether biological information is acquirable from the biological region specified by the specification circuitry; and
processing circuitry configured to receive the determination from the determination circuitry, wherein
on condition that the biological information is acquirable from the biological region and a processing setting for obscuring the biological information is off, the processing circuitry is configured to output a warning.

* * * * *